United States Patent
Huang et al.

(10) Patent No.: US 10,285,099 B2
(45) Date of Patent: May 7, 2019

(54) COMMUNICATION METHOD, BASE STATION, AND USER EQUIPMENT

(71) Applicant: Huawei Technologies Co., Ltd., Shenzhen (CN)

(72) Inventors: Qufang Huang, Shanghai (CN); Jian Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 15/527,282

(22) PCT Filed: May 15, 2013

(86) PCT No.: PCT/CN2013/075648
§ 371 (c)(1),
(2) Date: May 16, 2017

(87) PCT Pub. No.: WO2014/183280
PCT Pub. Date: Nov. 20, 2014

(65) Prior Publication Data
US 2017/0367018 A1    Dec. 21, 2017

(51) Int. Cl.
*H04W 36/00*    (2009.01)
*H04W 36/04*    (2009.01)
*H04W 8/26*    (2009.01)
*H04W 74/08*    (2009.01)
*H04W 16/32*    (2009.01)

(52) U.S. Cl.
CPC ............ *H04W 36/04* (2013.01); *H04W 8/26* (2013.01); *H04W 74/085* (2013.01); *H04W 16/32* (2013.01)

(58) Field of Classification Search
CPC ............. H04L 63/0876; H04L 65/1006; H04L 65/102; H04L 69/08; H04W 12/06; H04W 12/08; H04W 84/045; H04W 8/22
See application file for complete search history.

(56) References Cited

U.S. PATENT DOCUMENTS

2005/0247779 A1* 11/2005 Ohkubo ............ G06K 7/10346
235/383
2007/0211665 A1* 9/2007 Yoshida .............. H04W 72/121
370/331
(Continued)

FOREIGN PATENT DOCUMENTS

CN    101998550 A    3/2011
CN    102761954 A    10/2012
(Continued)

*Primary Examiner* — Khalid W Shaheed
(74) *Attorney, Agent, or Firm* — Leydig, Voit & Mayer, Ltd.

(57) ABSTRACT

Embodiments of the present invention provide a communication method, which includes: requesting, by a first base station, a second base station to add a cell of the second base station as a serving cell of first user equipment; when finding that a first identifier of the first user equipment is the same as an identifier of second user equipment served by the second base station, indicating, by the second base station to the first base station, that the first identifier is the same as the second identifier; and adjusting, by the first base station, the first identifier to a third identifier, and sending the third identifier to the second base station.

18 Claims, 16 Drawing Sheets

(56) References Cited

U.S. PATENT DOCUMENTS

2011/0292911 A1* 12/2011 Uemura ............ H04W 36/0072
370/331
2014/0105154 A1 4/2014 Yang et al.
2014/0192735 A1* 7/2014 Sridharan ............... H04W 8/26
370/329

FOREIGN PATENT DOCUMENTS

WO    WO 2013025086 A2    2/2013
WO    WO 2014075259 A1 *  5/2014  .............. H04W 8/22

* cited by examiner

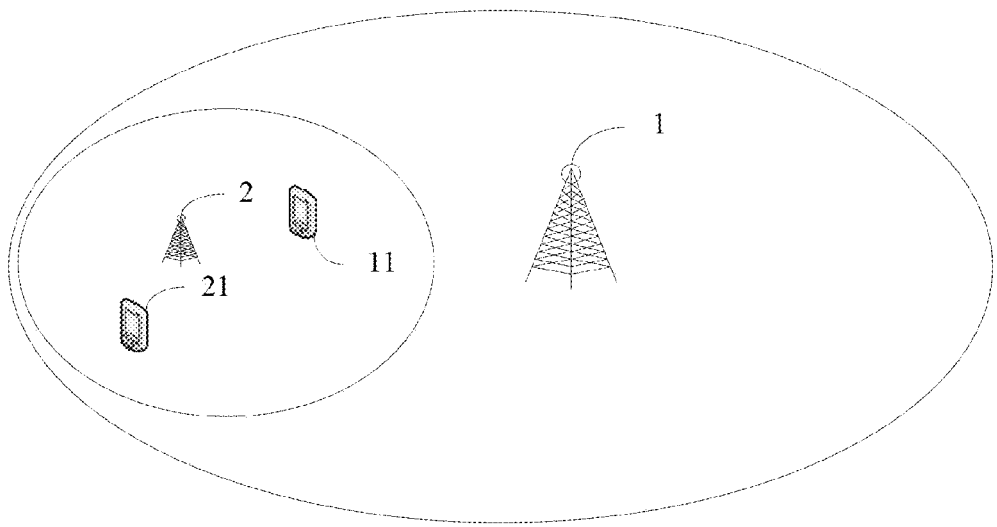

FIG. 1

A first base station sends a request message to a second base station, where the request message is used to request the second base station to add a cell of the second base station as a serving cell of first user equipment, the request message includes a first identifier of the first user equipment, and the first base station serves the first user equipment — 101

The first base station receives a response message sent by the second base station — 102

When the response message indicates that the first identifier is the same as a second identifier of second user equipment, the first base station performs collision processing on the first identifier, where the second base station serves the second user equipment — 103

The first base station adds the cell of the second base station as a serving cell of the first user equipment — 104

FIG. 2

| A second base station receives a request message sent by a first base station, where the request message is used to request the second base station to add a cell of the second base station as a serving cell of first user equipment, the request message includes a first identifier of the first user equipment, and the first base station serves the first user equipment | ⸺ 201 |

| When the second base station determines that the first identifier is different from a second identifier of second user equipment, the second base station sends a response message to the first base station, so that the first base station adds the cell of the second base station as a serving cell of the first user equipment, where the second base station serves the second user equipment | ⸺ 202 |

FIG. 3

| First user equipment receives a third identifier sent by a first base station, where the first base station serves the first user equipment, and the third identifier is used by the first user equipment to communicate with the first base station | ⸺ 301 |

| The first user equipment sends the third identifier to a second base station, where the third identifier is different from an identifier of user equipment served by the second base station, and the second base station serves second user equipment | ⸺ 302 |

| The first user equipment communicates with the second base station by using the third identifier | ⸺ 303 |

FIG. 4

CONT.
FROM
FIG. 7A

507 — After receiving the response message, the first base station triggers an intra-base station identifier change procedure, according to an indication, in the response message, that the first identifier is the same as the second identifier of the second user equipment, and selects a third identifier, where the third identifier is not in the identifier list of the user equipment served by the second base station; and then changes an identifier used by the first user equipment from the first identifier to the third identifier 508 — The first base station adds the cell of the second base station as a serving cell of the first user equipment, and sends the third identifier to the second base station to indicate that the identifier currently used by the first user equipment is changed from the first identifier to the third identifier

FIG. 7B

COMMUNICATION METHOD, BASE STATION, AND USER EQUIPMENT

CROSS-REFERENCE TO RELATED APPLICATIONS

This application is a National Stage of International Application No. PCT/CN2013/075648, filed on May 15, 2013, the disclosure of which is hereby incorporated by reference in its entirety.

TECHNICAL FIELD

The embodiments of the present invention relate to the communications field, and in particular, to a communication method, a base station, and user equipment.

BACKGROUND

With development of a mobile communications system, a transmission rate and service quality that the system can provide are increasingly high, and user services also impose an increasingly strict requirement on a transmission rate. To ensure rates for common users and provide higher throughput for some users without substantially increasing configured bandwidth, the $3^{rd}$ Generation Partnership Project (the 3rd Generation Partnership Project, 3GPP) introduces a carrier aggregation (Carrier Aggregation, CA) technology. Carrier aggregation means that user equipment (User Equipment, UE) can perform uplink-downlink communication by using multiple component carriers (Component Carrier, CC) at the same time, so that high-speed data transmission is supported. When a user rate decreases, some component carriers may be released, and only one resident carrier is retained. A released transmission resource may be used by another user.

Carrier aggregation in an LTE system may be roughly classified into intra-base station cell aggregation, inter-base station cell aggregation, and the like according to base station locations on which aggregated carriers are located. The intra-base station cell aggregation means that component carriers used by UE at the same time are controlled by a same base station and is relatively simple. The inter-base station cell aggregation means that component carriers used by UE at the same time are controlled by different base stations. In a current protocol, only the intra-base station cell aggregation is supported.

A cell temporary identifier (Cell Radio Network Temporary Identifier, C-RNTI) is a temporary identifier allocated by a base station to UE, and only connected-mode UE has a C-RNTI. The base station uses the temporary identifier to transmit downlink data to the UE, allocate an uplink resource, and transmit various types of control signaling. When UE establishes a connection to a cell, a corresponding base station allocates a C-RNTI to the UE, and when the UE is handed over to another cell because of mobility or for another reason, a base station of the new cell allocates a new C-RNTI to the UE. That is, a C-RNTI is valid only in a current cell.

After CA is introduced, UE needs to perform data and signaling transmission with a base station by using two or more cells at the same time and by using two C-RNTIs accordingly. However, in the prior art, aggregated cells belong to a same base station, and for simplified implementation of UE, it is ensured that the base station uses a same C-RNTI to perform data transmission with the UE in two cells. Therefore, it is specified that UE uses only one C-RNTI. However, after inter-base station cell aggregation is introduced, a mechanism for allocating a C-RNTI to UE needs to be introduced, so that normal communication between UE and a base station can be ensured.

SUMMARY

Embodiments of the present invention provide a communication method, a base station, and user equipment, and provide a mechanism for allocating a C-RNTI to UE, so that a problem of a cell temporary identifier collision is resolved.

To achieve the foregoing objective, the following technical solutions are used in the embodiments of the present invention.

According to a first aspect, a communication method is provided, where the method includes:

sending, by a first base station, a request message to a second base station, where the request message is used to request the second base station to add a cell of the second base station as a serving cell of first user equipment, the request message includes a first identifier of the first user equipment, and the first base station serves the first user equipment;

receiving, by the first base station, a response message sent by the second base station;

when the response message indicates that the first identifier is the same as a second identifier of second user equipment, performing, by the first base station, collision processing on the first identifier, where the second base station serves the second user equipment; and adding, by the first base station, the cell of the second base station as a serving cell of the first user equipment.

With reference to the first aspect, in a first possible implementation manner, the response message further includes an identifier list of user equipment served by the second base station, and the identifier list includes the second identifier; and the performing, by the first base station, collision processing on the first identifier specifically includes:

adjusting, by the first base station, the first identifier to a third identifier, where the identifier list does not include the third identifier.

With reference to the first aspect, in a second possible implementation manner, the method further includes:

sending, by the first base station, the third identifier to the second base station.

With reference to the first aspect, in a third possible implementation manner, the response message further includes a preamble of the user equipment, so that the first user equipment initiates random access according to the preamble, and sends the third identifier to the second base station by using a received uplink resource in a random access response.

With reference to any one of the first aspect or the first to the third possible implementation manners of the first aspect, in a fourth possible implementation manner, the first identifier to the third identifier are separately cell radio network temporary identifiers of user equipment.

With reference to any one of the first aspect or the first to the fourth possible implementation manners of the first aspect, in a fifth possible implementation manner, the first base station is a macro base station, and the second base station is a micro base station.

According to a second aspect, a communication method is provided, where the method includes:

receiving, by a second base station, a request message sent by a first base station, where the request message is used to request the second base station to add a cell of the second base station as a serving cell of first user equipment, the request message includes a first identifier of the first user equipment, and the first base station serves the first user equipment; and when the second base station determines that the first identifier is different from a second identifier of second user equipment, sending, by the second base station, a response message to the first base station, so that the first base station adds the cell of the second base station as a serving cell of the first user equipment, where the second base station serves the second user equipment.

With reference to the second aspect, in a first possible implementation manner, the method further includes:

determining, by the second base station, whether the first identifier is the same as the second identifier; and when the second base station determines that the first identifier is the same as the second identifier, adjusting, by the second base station, the second identifier to a third identifier, where the third identifier is different from an identifier of user equipment served by the second base station.

With reference to the second aspect or the first possible implementation manner of the second aspect, in a second possible implementation manner, the first identifier to the third identifier are separately cell radio network temporary identifiers of user equipment.

With reference to any one of the second aspect or the first or the second possible implementation manner of the second aspect, in a third possible implementation manner, the first base station is a macro base station, and the second base station is a micro base station.

According to a third aspect, a communication method is provided, where the method includes:

receiving, by first user equipment, a third identifier sent by a first base station, where the first base station serves the first user equipment, and the third identifier is used by the first user equipment to communicate with the first base station;

sending, by the first user equipment, the third identifier to a second base station, where the third identifier is different from an identifier of user equipment served by the second base station, and the second base station serves the second user equipment; and communicating, by the first user equipment, with the second base station by using the third identifier.

With reference to the third aspect, in a first possible implementation manner, if the third identifier sent by the first base station is not received, the method further includes:

updating, by the first user equipment, a first identifier of the first user equipment to the third identifier, where the first identifier is the same as the second identifier.

With reference to the third aspect or the first possible implementation manner of the third aspect, in a second possible implementation manner, the sending, by the first user equipment, the third identifier to a second base station specifically includes:

receiving, by the first user equipment, a preamble sent by the first base station; and initiating, by the first user equipment, random access according to the preamble, and sending the third identifier to the second base station by using a received uplink resource in the random access response.

With reference to any one of the third aspect or the first or the second possible implementation manner of the third aspect, in a third possible implementation manner, the first identifier to the third identifier are separately cell radio network temporary identifiers of user equipment.

With reference to any one of the third aspect or the first to the third possible implementation manners of the third aspect, in a fourth possible implementation manner, the first base station is a macro base station, and the second base station is a micro base station.

According to a fourth aspect, a base station is provided, where the base station includes:

a sending unit, configured to send a request message to a second base station, where the request message is used to request the second base station to add a cell of the second base station as a serving cell of first user equipment, the request message includes a first identifier of the first user equipment, and the base station serves the first user equipment;

a receiving unit, configured to receive a response message sent by the second base station;

a processing unit, configured to: when the response message indicates that the first identifier is the same as a second identifier of second user equipment, perform collision processing on the first identifier, where the second base station serves the second user equipment; and a management unit, configured to add the cell of the second base station as a serving cell of the first user equipment.

With reference to the fourth aspect, in a first possible implementation manner, the response message further includes an identifier list of user equipment served by the second base station, and the identifier list includes the second identifier; and the processing unit is specifically configured to:

adjust the first identifier to a third identifier, where the identifier list does not include the third identifier.

With reference to the first possible implementation manner of the fourth aspect, in a second possible implementation manner, the sending unit is further configured to:

send the third identifier to the second base station.

With reference to the fourth aspect, in a third possible implementation manner, the response message further includes a preamble of the first user equipment, so that the first user equipment initiates random access according to the preamble, and sends the third identifier to the second base station by using a received uplink resource in a random access response.

With reference to any one of the fourth aspect or the first to the third possible implementation manners of the fourth aspect, in a fourth possible implementation manner, the first identifier to the third identifier are separately cell radio network temporary identifiers of user equipment.

With reference to any one of the fourth aspect or the first to the fourth possible implementation manners of the fourth aspect, in a fifth possible implementation manner, the base station is a macro base station, and the second base station is a micro base station.

According to a fifth aspect, a base station is provided, where the base station includes:

a receiving unit, configured to receive a request message sent by a first base station, where the request message is used to request the base station to add a cell of the base station as a serving cell of first user equipment, the request message includes a first identifier of the first user equipment, and the first base station serves the first user equipment; and a sending unit, configured to: when it is determined that the first identifier is different from a second identifier of second user equipment, send a response message to the first base station, so that the first base station adds the cell of the base station as a serving cell of the first user equipment, where the base station serves the second user equipment.

With reference to the fifth aspect, in a first possible implementation manner, the base station further includes:

a determining unit, configured to: determine whether the first identifier is the same as the second identifier, and send a determining result to a processing unit; and the processing unit, configured to: receive the processing result sent by the determining unit, and when it is determined that the first identifier is the same as the second identifier, adjust the second identifier to a third identifier, where the third identifier is different from an identifier of user equipment served by the base station.

With reference to the fifth aspect or the first possible implementation manner of the fifth aspect, in a second possible implementation manner, the first identifier to the third identifier are separately cell radio network temporary identifiers of user equipment.

With reference to any one of the fifth aspect or the first or the second possible implementation manner of the fifth aspect, in a third possible implementation manner, the first base station is a macro base station, and the base station is a micro base station.

According to a sixth aspect, user equipment is provided, where the user equipment includes:

a receiving unit, configured to receive a third identifier sent by a first base station, where the first base station serves the user equipment, and the third identifier is used by the user equipment to communicate with the first base station;

a sending unit, configured to send the third identifier to a second base station, where the third identifier is different from an identifier of user equipment served by the second base station, and the second base station serves second user equipment; and a communications unit, configured to communicate with the second base station by using the third identifier.

With reference to the sixth aspect, in a first possible implementation manner, the user equipment further includes:

a processing unit, configured to: if the third identifier sent by the first base station is not received, update a first identifier of the user equipment to the third identifier, where the first identifier is the same as the second identifier.

With reference to the sixth aspect or the first possible implementation manner of the sixth aspect, in a second possible implementation manner, the sending unit is specifically configured to:

receive a preamble sent by the first base station; and initiate random access according to the preamble, and send the third identifier to the second base station by using a received uplink resource in the random access response.

With reference to any one of the sixth aspect or the first or the second possible implementation manner of the sixth aspect, in a third possible implementation manner, the first identifier to the third identifier are separately cell radio network temporary identifiers of user equipment.

With reference to any one of the sixth aspect or the first to the third possible implementation manners of the sixth aspect, in a fourth possible implementation manner, the first base station is a macro base station, and the second base station is a micro base station.

According to a seventh aspect, a base station is provided, including a receiver, a transmitter, a memory, and a processor, where the memory is configured to store computer code;

the transmitter is configured to send a request message to a second base station, where the request message is used to request the second base station to add a cell of the second base station as a serving cell of first user equipment, the request message includes a first identifier of the first user equipment, and the base station serves the first user equipment;

the receiver is configured to receive a response message sent by the second base station; and the processor executes the computer code to perform the following operations:

when the response message indicates that the first identifier is the same as a second identifier of second user equipment, performing collision processing on the first identifier; and adding the cell of the second base station as a serving cell of the first user equipment, where the second base station serves the second user equipment.

With reference to the seventh aspect, in a first possible implementation manner, the response message further includes an identifier list of user equipment served by the second base station, and the identifier list includes the second identifier; and that the processor executes the computer code to specifically perform collision processing on the first identifier specifically includes:

adjusting the first identifier to a third identifier, where the identifier list does not include the third identifier.

With reference to the first possible implementation manner of the seventh aspect, in a second possible implementation manner, the transmitter is further configured to:

send the third identifier to the second base station.

With reference to the first possible implementation manner of the seventh aspect, in a third possible implementation manner, the response message further includes a preamble of the user equipment, so that the first user equipment initiates random access according to the preamble, and sends the third identifier to the second base station by using a received uplink resource in a random access response.

With reference to any one of the seventh aspect or the first to the third possible implementation manners of the seventh aspect, in a fourth possible implementation manner, the first identifier to the third identifier are separately cell radio network temporary identifiers of user equipment.

With reference to any one of the seventh aspect or the first to the fourth possible implementation manners of the seventh aspect, in a fifth possible implementation manner, the base station is a macro base station, and the second base station is a micro base station.

According to an eighth aspect, a base station is provided, where the base station includes a receiver, a transmitter, a memory, and a processor, where the memory is configured to store computer code;

the receiver is configured to receive a request message sent by a first base station, where the request message is used to request the base station to add a cell of the base station as a serving cell of first user equipment, the request message includes a first identifier of the first user equipment, and the first base station serves the first user equipment; and the transmitter is configured to: when it is determined that the first identifier is different from a second identifier of second user equipment, send a response message to the first base station, so that the first base station adds the cell of the base station as a serving cell of the first user equipment, where the base station serves the second user equipment.

With reference to the eighth aspect, in a first possible implementation manner, the processor executes the computer code to perform the following operations:

determining whether the first identifier is the same as the second identifier; and when it is determined that the first identifier is the same as the second identifier, adjusting the second identifier to a third identifier, where the third identifier is different from an identifier of user equipment served by the second base station.

With reference to the eighth aspect or the first possible implementation manner of the eighth aspect, in a second possible implementation manner, the first identifier to the third identifier are separately cell radio network temporary identifiers of user equipment.

With reference to any one of the eighth aspect or the first or the second possible implementation manner of the eighth aspect, in a third possible implementation manner, the first base station is a macro base station, and the base station is a micro base station.

According to a ninth aspect, user equipment is provided, where the user equipment includes a receiver, a transmitter, a memory, and a processor, where the memory is configured to store computer code;

the receiver is configured to receive a third identifier sent by a first base station, where the first base station serves the user equipment, and the third identifier is used by the user equipment to communicate with the first base station;

the transmitter is configured to send the third identifier to a second base station, where the third identifier is different from an identifier of user equipment served by the second base station, and the second base station serves the second user equipment; and the processor executes the computer code to communicate with the second base station by using the third identifier.

With reference to the ninth aspect, in a first possible implementation manner, if the third identifier sent by the first base station is not received, the processor executes the computer code to specifically perform the following operation:

updating a first identifier of the user equipment to the third identifier, where the first identifier is the same as the second identifier.

With reference to the ninth aspect or the first possible implementation manner of the ninth aspect, in a second possible implementation manner, the receiver is specifically configured to receive a preamble sent by the first base station; and the transmitter is specifically configured to: initiate random access according to the preamble, and send the third identifier to the second base station by using a received uplink resource in the random access response.

With reference to any one of the ninth aspect or the first or the second possible implementation manner of the ninth aspect, in a third possible implementation manner, the first identifier to the third identifier are separately cell radio network temporary identifiers of user equipment.

With reference to any one of the ninth aspect or the first to the third possible implementation manners of the ninth aspect, in a fourth possible implementation manner, the first base station is a macro base station, and the second base station is a micro base station.

The embodiments of the present invention provide a communication method, a base station, and user equipment. A first base station sends a request message to a second base station, to request the second base station to add a cell of the second base station as a serving cell of first user equipment. When finding that a first identifier of the first user equipment is the same as an identifier of second user equipment served by the second base station, the second base station sends a response message to the first base station to indicate that the first identifier is the same as the second identifier. The first base station adjusts the first identifier to a third identifier, and sends the third identifier to the second base station; or the second base station adjusts the first identifier to a third identifier; or the second base station allocates a preamble to the first user equipment, and the first user equipment initiates random access according to the preamble, and sends a third identifier to the second base station by using a received uplink resource in a random access response. Therefore, a cell temporary identifier collision is avoided.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of an application scenario according to an embodiment of the present invention;

FIG. 2 is a schematic flowchart of a communication method according to an embodiment of the present invention;

FIG. 3 is a schematic flowchart of a communication method according to an embodiment of the present invention;

FIG. 4 is a schematic flowchart of a communication method according to an embodiment of the present invention;

FIG. 7A and FIG. 7B are a schematic flowchart of another communication method according to an embodiment of the present invention;

DESCRIPTION OF EMBODIMENTS

Figure 5:
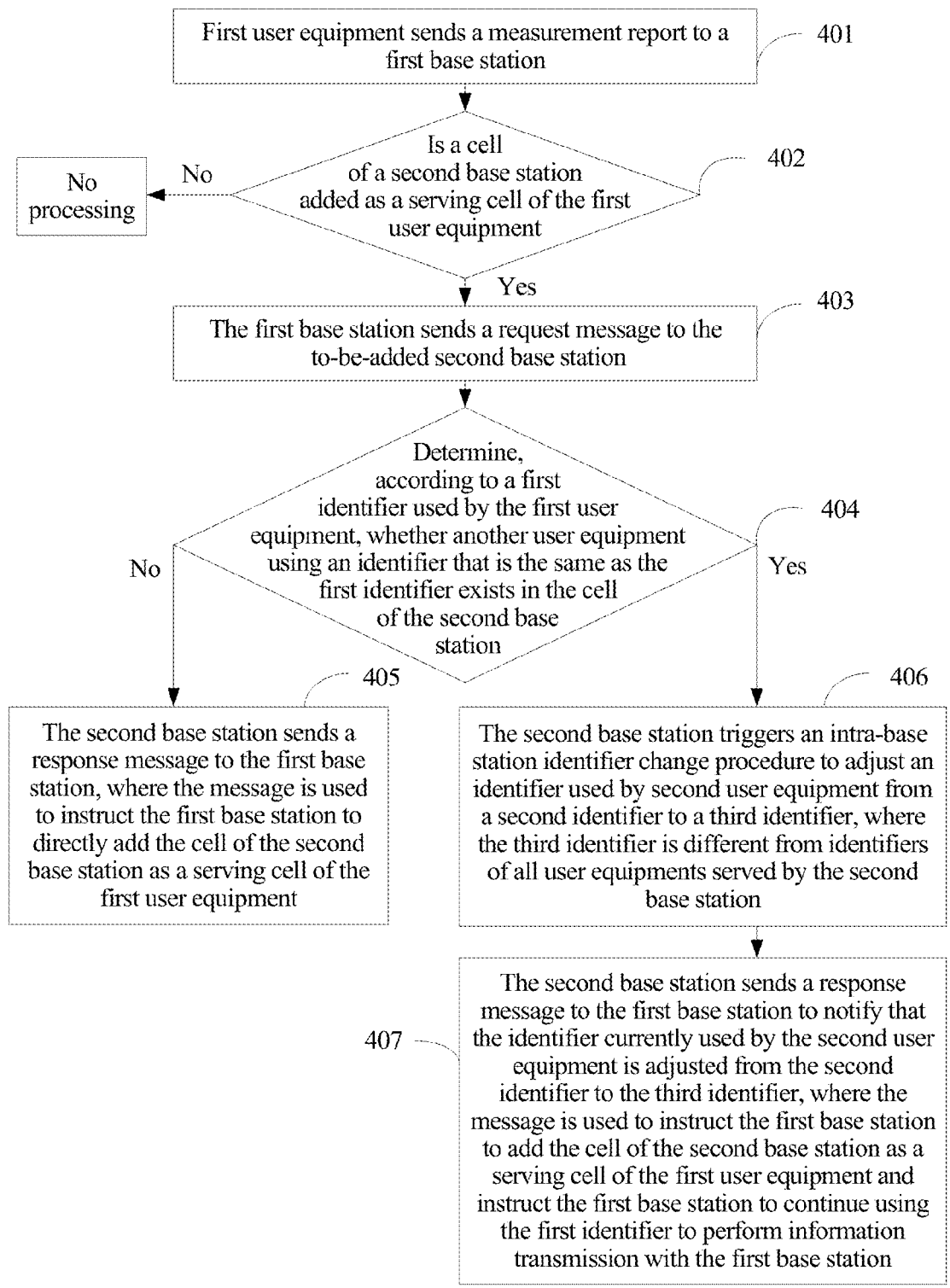
FIG. 5 is a schematic flowchart of another communication method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that the embodiments of the present invention are applied to inter-base station cell aggregation. As shown in FIG. 1, the scenario may include a first base station 1, a second base station 2, first user equipment 11, and second user equipment 21. The first base station 1 serves the first user equipment 11, the second base station serves the second user equipment 21, the first user equipment 11 communicates with the first base station 1 by using a first identifier, and the second user equipment 21 communicates with the second base station 2 by using a second identifier. For example, in this embodiment, a cell of the first base station 1 is a primary cell, and a cell of the second base station 2 is a secondary cell that is to be added to the first user equipment 11. In the embodiments of the present invention, the primary cell may be understood as a macro cell, the to-be-added secondary cell may be understood as a micro cell, the macro cell is a cell with relatively large coverage, and the micro cell is a cell with relatively small coverage. Location relationships among the first base station 1, the second base station 2, the first user equipment 11, and the second user equipment 21, and coverage of the first base station 1 and the second base station 2 in FIG. 1 are merely examples, and the location relationships and the coverage may be other cases.

An embodiment of the present invention provides a communication method. As shown in FIG. 2, based on a first base station side, the method includes the following steps.

101. A first base station sends a request message to a second base station, where the request message is used to request the second base station to add a cell of the second base station as a serving cell of first user equipment, the request message includes a first identifier of the first user equipment, and the first base station serves the first user equipment.

102. The first base station receives a response message sent by the second base station.

The response message may further include an identifier list of user equipment served by the second base station, and the identifier list includes a second identifier.

103. When the response message indicates that the first identifier is the same as a second identifier of second user equipment, the first base station performs collision processing on the first identifier, where the second base station serves the second user equipment.

Performing collision processing may specifically include:
adjusting, by the first base station, the first identifier to a third identifier, where the identifier list does not include the third identifier.

104. The first base station adds the cell of the second base station as a serving cell of the first user equipment.

In addition, after step 104, the method may further include:
sending, by the first base station, the third identifier to the second base station, so that the first user equipment communicates with the second base station by using the third identifier.

Correspondingly, an embodiment of the present invention further provides another communication method. Based on a second base station side, as shown in FIG. 3, the method includes the following steps.

201. A second base station receives a request message sent by a first base station, where the request message is used to request the second base station to add a cell of the second base station as a serving cell of first user equipment, the request message includes a first identifier of the first user equipment, and the first base station serves the first user equipment.

202. When the second base station determines that the first identifier is different from a second identifier of second user equipment, the second base station sends a response message to the first base station, so that the first base station adds the cell of the second base station as a serving cell of the first user equipment, where the second base station serves the second user equipment.

A method for determining whether the first identifier is different from the second identifier of the second user equipment may be:
The first identifier of the first user equipment is compared with identifiers of all user equipments in the cell of the second base station, so as to determine whether second user equipment using a second identifier that is the same as the first identifier exists in the cell of the second base station. The second user equipment herein is not designated and may be any user equipment in the cell of the second base station.

In addition, an embodiment of the present invention provides still another communication method. Based on a first user equipment side, as shown in FIG. 4, the method includes the following steps.

301. First user equipment receives a third identifier sent by a first base station, where the first base station serves the first user equipment, and the third identifier is used by the first user equipment to communicate with the first base station.

302. The first user equipment sends the third identifier to a second base station, where the third identifier is different from an identifier of user equipment served by the second base station, and the second base station serves second user equipment.

303. The first user equipment communicates with the second base station by using the third identifier.

In addition, if the third identifier sent by the first base station is not received, after step 302 and before step 303, the method may include: receiving, by the first user equipment, a command sent by the first base station. The command is used to trigger a change procedure, so that the first user equipment adjusts the first identifier to the third identifier.

The command sent by the first base station includes a preamble allocated by the second base station to the first user equipment, so that after adjusting the first identifier to the third identifier, the first user equipment initiates random access by using the preamble.

Then, the third identifier is sent to the second base station by using a received uplink resource in a random access response.

The first identifier to the third identifier are separately cell radio network temporary identifiers of user equipment.

The embodiments of the present invention provide a communication method, a base station, and user equipment. A first base station sends a request message to a second base station, to request the second base station to add a cell of the second base station as a serving cell of first user equipment. When finding that a first identifier of the first user equipment is the same as an identifier of second user equipment served by the second base station, the second base station sends a response message to the first base station to indicate that the first identifier is the same as the second identifier. The first base station adjusts the first identifier to a third identifier, and sends the third identifier to the second base station; or the second base station adjusts the first identifier to a third identifier; or the second base station allocates a preamble to the first user equipment, and the first user equipment initiates random access according to the preamble, and sends a third identifier to the second base station by using a received uplink resource in a random access response. Therefore, a cell temporary identifier collision is avoided.

To make a person skilled in the art more clearly understand technical solutions provided in the embodiments of the present invention, the following describes, in detail by using a specific embodiment, another communication method provided in an embodiment of the present invention. As shown in FIG. 5, the method includes the following steps.

401. First user equipment sends a measurement report to a first base station.

Specifically, the connected-mode first user equipment performs information transmission with a cell of the first base station, that is, a serving cell of the first user equipment by using a first identifier. After the first user equipment detects a cell with a relatively strong signal, for example, a cell of a second base station, the first user equipment sends the measurement report to the first base station, so that the first base station determines, according to the measurement report, whether to add the cell of the second base station as a serving cell of the first user equipment.

402. After receiving the measurement report sent by the first user equipment, the first base station determines, according to the measurement report, whether to add a cell of a second base station as a serving cell of the first user equipment, and if the first base station determines to add the cell of the second base station for the first user equipment, performs step 403, or if the first base station determines not to add the cell of the second base station for the first user equipment, performs no processing.

403. The first base station sends a request message to the to-be-added second base station, where the request message is used to request the second base station to add the cell of the second base station as a serving cell of the first user equipment.

For example, the request message includes the first identifier used by the first user equipment, and may further include an ID of the cell of the first base station.

404. After receiving the request message sent by the first base station, the second base station determines, according to a first identifier used by the first user equipment that is in the request message, whether another user equipment using an identifier that is the same as the first identifier exists in coverage of the cell of the second base station.

If user equipment using an identifier that is the same as the first identifier does not exist, step 405 is performed. If user equipment using an identifier that is the same as the first identifier exists, assuming that second user equipment exists in the cell of the second base station and a second identifier used by the second user equipment is the same as the first identifier, step 406 and step 407 are performed.

405. The second base station sends a response message to the first base station, where the message is used to instruct the first base station to directly add the cell of the second base station as a serving cell of the first user equipment.

406. The second base station triggers an intra-base station identifier change (Intra-eNB) procedure to adjust an identifier used by second user equipment from a second identifier to a third identifier, where the third identifier is different from identifiers of all user equipments served by the second base station.

407. The second base station sends a response message to the first base station to notify that the identifier currently used by the second user equipment is adjusted from the second identifier to the third identifier, where the message is used to instruct the first base station to add the cell of the second base station as a serving cell of the first user equipment and instruct the first base station to continue using the first identifier to perform information transmission with the first base station. Certainly, because a step of adjusting an identifier is performed by the second base station, the first base station is not concerned about whether the second base station performs the step of adjusting an identifier, but concerned only about whether the first user equipment can continue using the first identifier. Therefore, preferably, the second base station may not send a notification of adjusting an identifier to the first base station, and the second base station directly replies to the first base station with an "OK" message.

Figure 6:
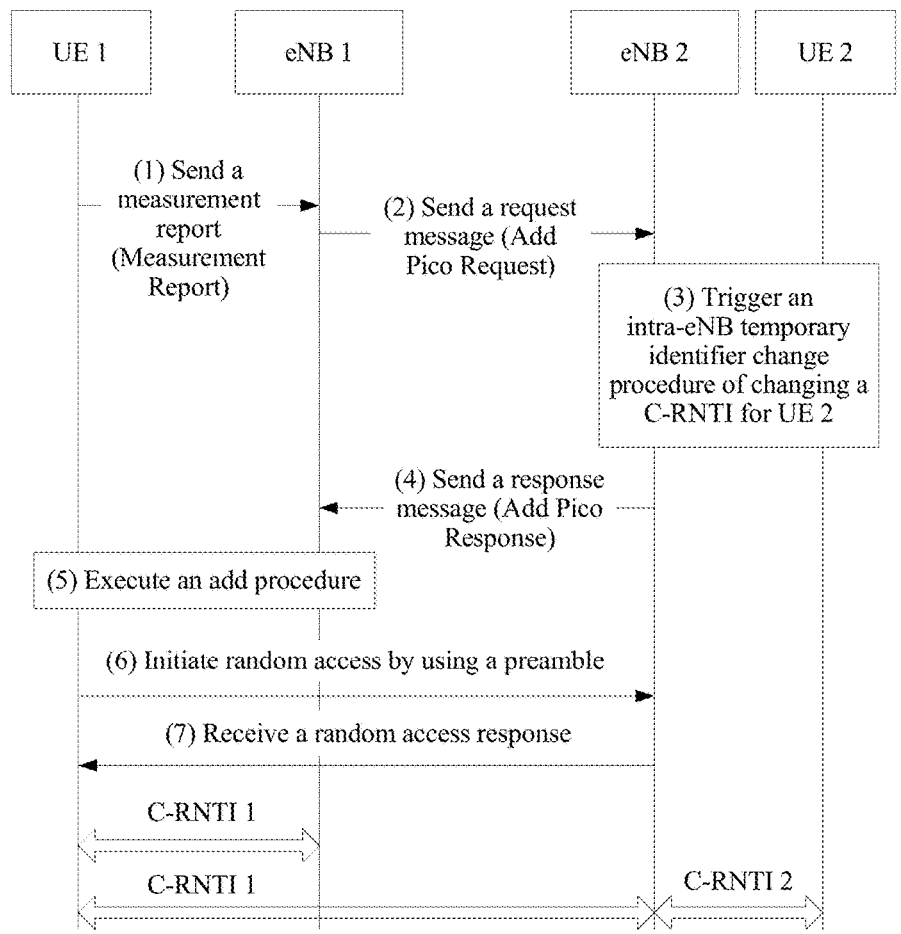
FIG. 6 is a schematic interaction flowchart of another communication method according to an embodiment of the present invention.

For example, to describe the foregoing method more vividly, a process of interaction among first user equipment, a first base station, a second base station, and second user equipment is described by using a procedure shown in FIG. 6. For ease of description, the first user equipment is represented by UE 1, the second user equipment is represented by UE 2, the first base station is represented by an eNB (evolved Node B, evolved NodeB) 1, the second base station is represented by an eNB 2, and a first identifier, a second identifier, and a third identifier may respectively be a C-RNTI 1, a C-RNTI 2, and a C-RNTI 3. Details are as follows.

(1) After detecting a cell with a relatively strong signal nearby, for example, a cell of the eNB 2, the UE 1 sends a measurement report "Measurement Report" to the eNB 1.

(2) After determining to add the cell of the eNB 2 for the UE 1, the eNB 1 sends a request message "Add Pico Request" to the eNB 2.

(3) After receiving the "Add Pico Request", the eNB 2 finds that the C-RNTI 1 used by the UE 1 is the same as the C-RNTI 2 used by the UE 2, and therefore, the eNB 2 triggers an intra-eNB identifier change procedure of changing a C-RNTI for the UE 2. The C-RNTI of the UE 2 is changed from the C-RNTI 2 to the C-RNTI 3.

(4) The eNB 2 sends a response message "Add Pico Response" to the eNB 1.

(5) The eNB 1 and the UE 1 execute an add procedure "Add Pico to UE" to add the cell of the eNB 2 as a serving cell for the UE 1.

(6) The UE 1 initiates random access by using a preamble (Preamble) (The preamble herein is not a dedicated preamble and does not need to be allocated by the eNB 2). The preamble may also be referred to as a random access code, and the random access code is a bottom-layer random sequence. When initiating a random access process, each UE needs to select a random access code for sending. However, the random access code may be dedicated or may be common. If the random access code is a common random access code, the random access code may be selected by the UE and does not need to be allocated by a base station. If the random access code is a dedicated random access code, a base station needs to allocate the random access code. Each UE can use a dedicated random access code after being authorized, but cannot use a dedicated random access code without being authorized.

(7) The UE 1 receives a random access response sent by the eNB 2.

In this way, a process of adding the cell of the eNB 2 for the UE 1 is completed. Then, the UE 1 uses the C-RNTI 1 to perform information transmission with the eNB 1 and the eNB 2, and the UE 2 uses the C-RNTI 3 to perform information transmission with the eNB 2, so that interference caused by a C-RNTI collision is avoided.

Figure 7A:
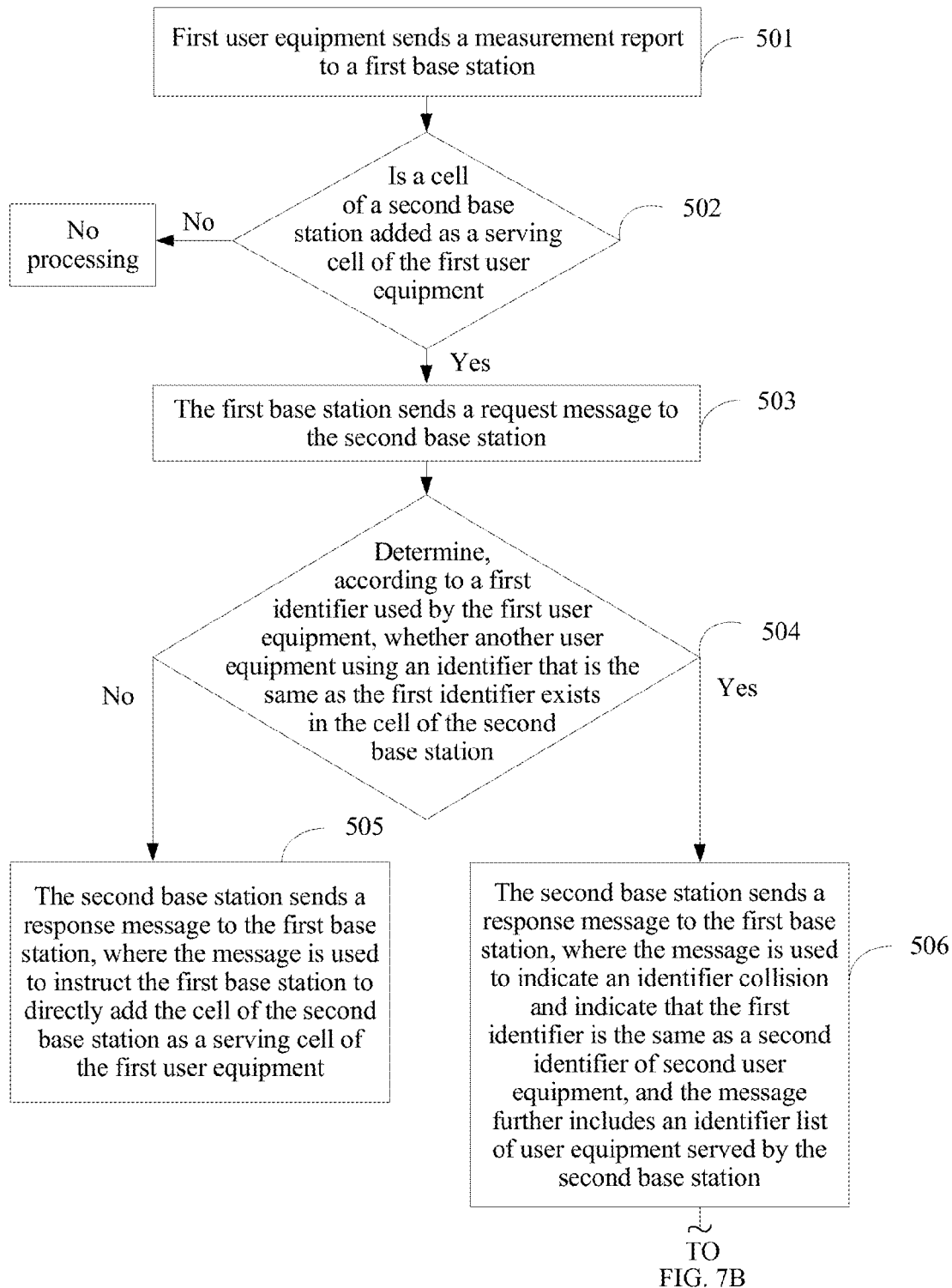

Alternatively, an embodiment of the present invention provides a communication method. As shown in FIG. 7A and FIG. 7B, the method includes the following steps.

501. First user equipment sends a measurement report to a first base station (This is identical with step 401. For details, refer to step 401, and details are not described herein).

502. After receiving the measurement report sent by the first user equipment, the first base station determines, according to the measurement report, whether to add a cell of a second base station as a serving cell of the first user equipment, and if the first base station determines to add the cell of the second base station for the first user equipment, performs step 503, or if the first base station determines not to add the cell of the second base station for the first user equipment, performs no processing.

503. The first base station sends a request message to the second base station (This is identical with step 403. For details, refer to step 403, and details are not described herein).

504. After receiving the request message sent by the first base station, the second base station determines, according to a first identifier used by the first user equipment that is in the request message, whether another user equipment using an identifier that is the same as the first identifier exists in coverage of the cell of the second base station.

If user equipment using an identifier that is the same as the first identifier does not exist, step 505 is performed. If user equipment using an identifier that is the same as the first identifier exists, assuming that second user equipment exists in the cell of the second base station and a second identifier used by the second user equipment is the same as the first identifier, step 506 to step 508 are performed.

505. The second base station sends a response message to the first base station, where the message is used to instruct the first base station to directly add the cell of the second base station as a serving cell of the first user equipment.

506. The second base station sends a response message to the first base station, where the message is used to indicate an identifier collision and indicate that the first identifier is the same as a second identifier of second user equipment, and the message further includes an identifier list of user equipment served by the second base station.

507. After receiving the response message, the first base station triggers an intra-base station identifier change procedure according to an indication, in the response message, that the first identifier is the same as the second identifier of the second user equipment, and selects a third identifier, where the third identifier is not in the identifier list of the user equipment served by the second base station; and then changes an identifier used by the first user equipment from the first identifier to the third identifier.

508. The first base station adds the cell of the second base station as a serving cell of the first user equipment, and sends the third identifier to the second base station to indicate that the identifier currently used by the first user equipment is changed from the first identifier to the third identifier.

Figure 8:
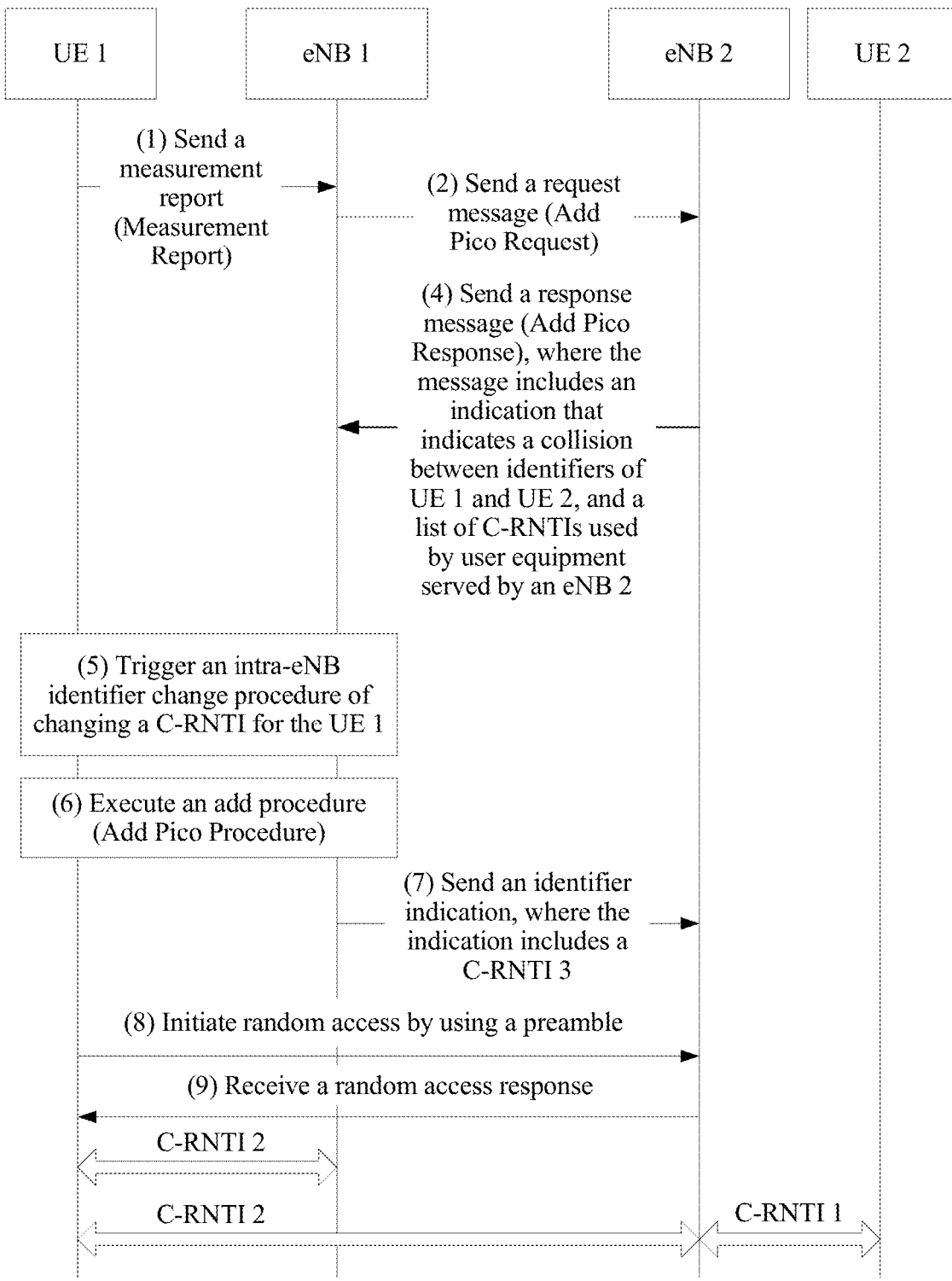
FIG. 8 is a schematic interaction flowchart of another communication method according to an embodiment of the present invention.

For example, to describe the foregoing method more vividly, a process of interaction among first user equipment, a first base station, a second base station, and second user equipment is described by using a procedure shown in FIG. 8. For ease of description, the first user equipment is represented by UE 1, the second user equipment is represented by UE 2, the first base station is represented by an eNB 1, the second base station is represented by an eNB 2, and a first identifier, a second identifier, and a third identifier may be respectively a C-RNTI 1, a C-RNTI 2, and a C-RNTI 3. Details are as follows.

(1) After detecting a cell with a relatively strong signal nearby, for example, a cell of the eNB 2 in the figure, the UE 1 sends a measurement report "Measurement Report" to the eNB 1.

(2) After determining to add the cell of the eNB 2 for the UE 1, the eNB 1 sends a request message "Add Pico Request" to the eNB 2.

(3) After receiving the "Add Pico Request", the eNB 2 finds that the C-RNTI 1 used by the UE 1 is the same as the C-RNTI 2 being used by the UE 2 in the cell of the eNB 2, and in this case, the eNB 2 may not change the C-RNTI of the UE 2, but enables the eNB 1 to change the C-RNTI of the UE 1 (not drawn in the figure).

(4) The eNB 2 sends a response message "Add Pico Response" to the eNB 1, where the "Add Pico Response" includes an indication "C-RNTI Collision" that indicates a collision between identifiers of the UE 1 and the UE 2, and a list of C-RNTIs "Current C-RNTI List" that are used by user equipment served by the eNB 2.

(5) The eNB 1 triggers an intra-eNB identifier change procedure of changing a C-RNTI for the UE 1, to adjust the C-RNTI of the UE 1 from the C-RNTI 1 to the C-RNTI 3.

(6) The eNB 1 and the UE 1 execute an add procedure "Add Pico Procedure" to add the cell of the eNB 2 as a serving cell of the UE 1.

(7) The eNB 1 sends an identifier indication "C-RNTI Indication" to the eNB 2, so as to send the C-RNTI 3 to the eNB 2.

(8) The UE 1 initiates random access by using a preamble (The preamble herein is not a dedicated preamble and does not need to be allocated by the eNB 2).

(9) The UE 1 receives a random access response sent by the eNB 2.

In this way, a process of adding the cell of the eNB 2 as a serving cell of the UE 1 is completed. Then, the UE 1 uses the C-RNTI 3 to perform information transmission with the eNB 1 and the eNB 2, and the UE 2 continues using the C-RNTI 2 to perform information transmission with the eNB 2, so that interference caused by a C-RNTI collision is avoided.

In step 508 of the method, the first base station sends, to the second base station by using an X2 interface (the X2 interface is a logical connection between two eNBs) or in another manner, a message indicating that an identifier used by the first user equipment is adjusted from the first identifier to the third identifier.

Figure 9A:
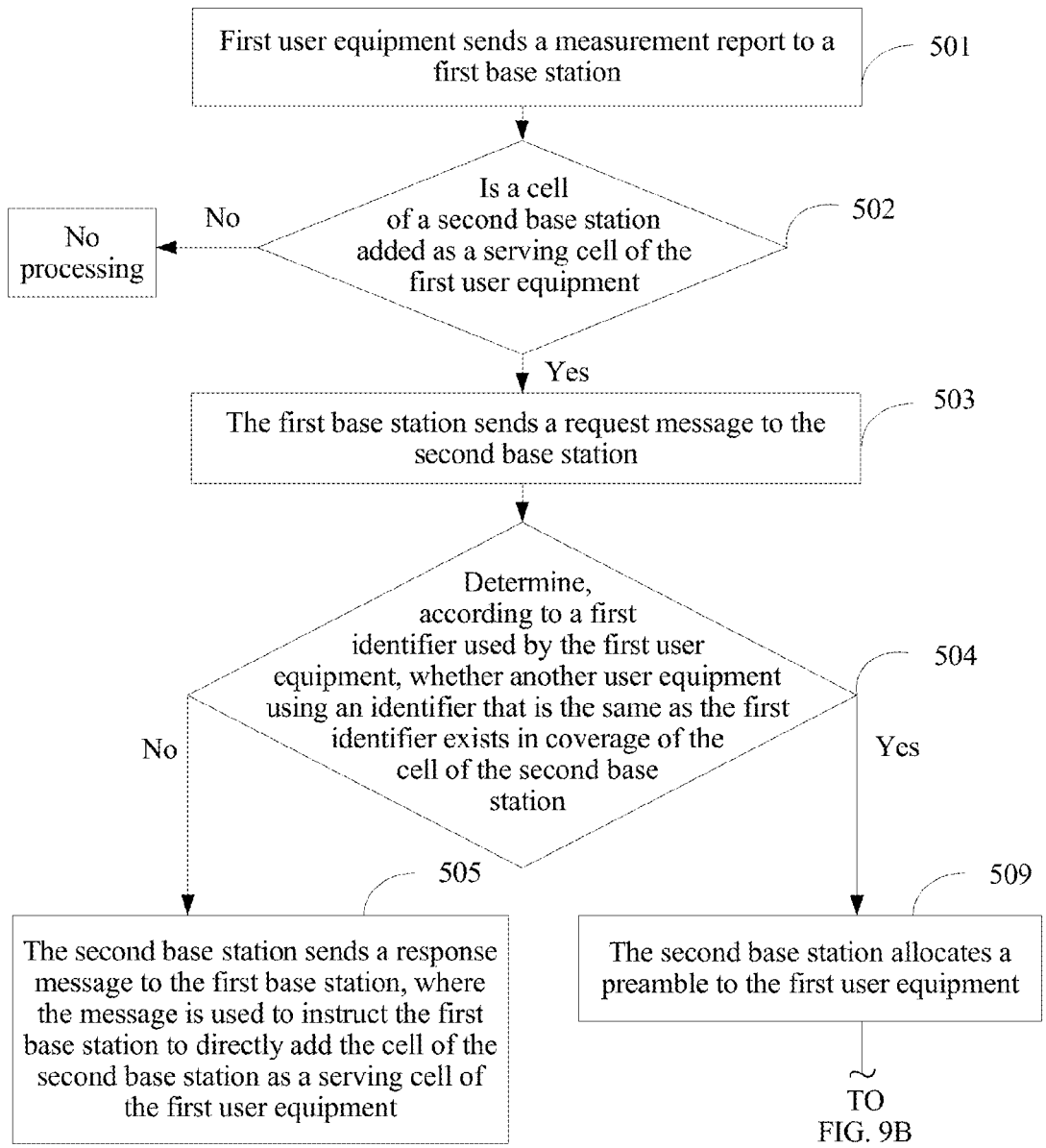
FIG. 9A and FIG. 9B are a schematic flowchart of another communication method according to an embodiment of the present invention.
Figure 9B:
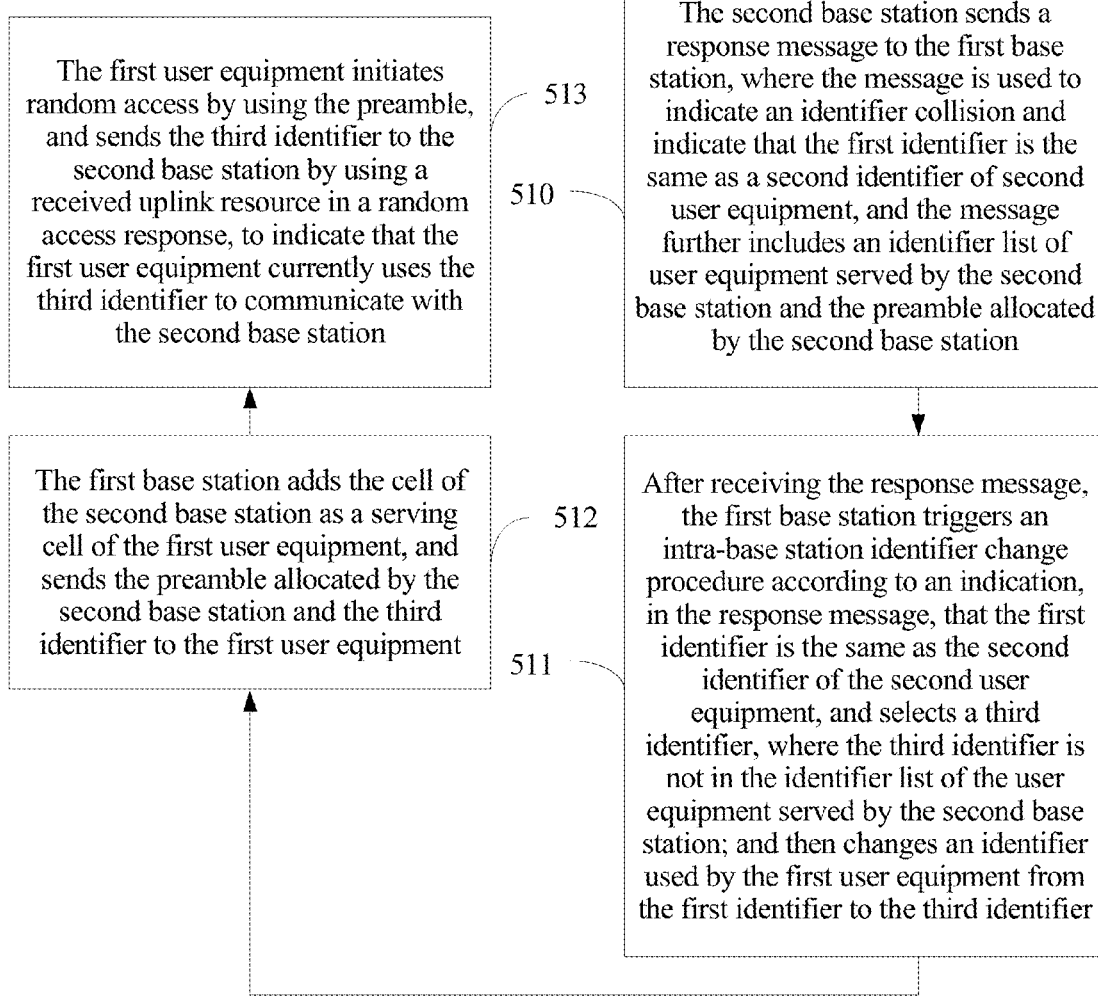

Therefore, optionally, in another implementation manner, as shown in FIG. 9A and FIG. 9B, after step 503, the following steps may be performed.

504. After receiving the request message sent by the first base station, the second base station determines, according to a first identifier used by the first user equipment that is in the request message, whether another user equipment using an identifier that is the same as the first identifier exists in coverage of the cell of the second base station.

If user equipment using an identifier that is the same as the first identifier does not exist, step 505 is performed. If user equipment using an identifier that is the same as the first identifier exists, assuming that second user equipment exists in the cell of the second base station and a second identifier used by the second user equipment is the same as the first identifier, step 509 to step 513 are performed.

509. The second base station allocates a preamble to the first user equipment (The preamble herein is a dedicated preamble and may also be referred to as a dedicated random access code).

510. The second base station sends a response message to the first base station, where the message is used to indicate an identifier collision and indicate that the first identifier is the same as a second identifier of second user equipment, and the message further includes an identifier list of user equipment served by the second base station and the preamble allocated by the second base station.

511. After receiving the response message, the first base station triggers an intra-base station identifier change procedure according to an indication, in the response message, that the first identifier is the same as the second identifier of the second user equipment, and selects a third identifier, where the third identifier is not in the identifier list of the user equipment served by the second base station; and then changes an identifier used by the first user equipment from the first identifier to the third identifier.

512. The first base station adds the cell of the second base station as a serving cell of the first user equipment, and sends the preamble allocated by the second base station and the third identifier to the first user equipment.

513. The first user equipment initiates random access by using the preamble, and sends the third identifier to the second base station by using a received uplink resource in a random access response (Random Access Response, RAR), to indicate that the first user equipment currently uses the third identifier to communicate with the second base station.

The uplink resource herein may be a physical uplink shared channel (Physical Uplink Shared Channel, PUSCH) resource. In the Long Term Evolution (Long Term Evolution, LTE), if each UE wants to send uplink data, the UE needs to request an eNB to allocate some uplink resources to the UE. The uplink resource is a combination of a specific time domain and a specific frequency domain. In this case, the base station receives a signal on a corresponding time-frequency resource, and therefore, knows user equipment that sends the received signal.

Figure 10:
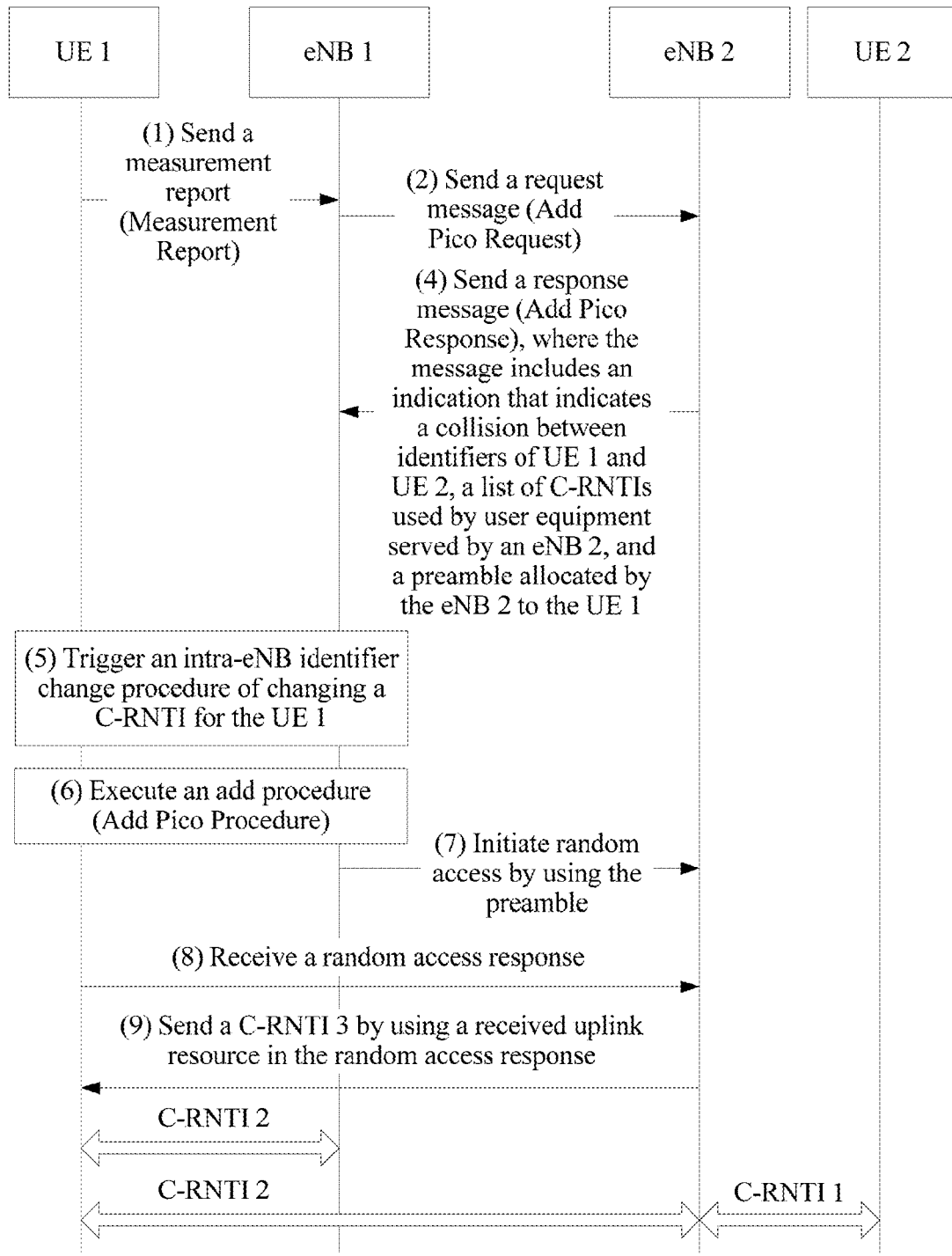
FIG. 10 is a schematic interaction flowchart of another communication method according to an embodiment of the present invention.

For example, to describe the foregoing method more vividly, a process of interaction among first user equipment, a first base station, a second base station, and second user equipment is described by using a procedure shown in FIG. 10. For ease of description, the first user equipment is represented by UE 1, the second user equipment is represented by UE 2, the first base station is represented by an eNB 1, the second base station is represented by an eNB 2, and a first identifier, a second identifier, and a third identifier may be respectively a C-RNTI 1, a C-RNTI 2, and a C-RNTI 3. Details are as follows.

(1) After detecting a cell with a relatively strong signal nearby, for example, a cell of the eNB 2, the UE 1 sends a measurement report "Measurement Report" to the eNB 1.

(2) After determining to add the cell of the eNB 2 as a serving cell of the UE 1, the eNB 1 sends a request message "Add Pico Request" to the eNB 2.

(3) After receiving the "Add Pico Request", the eNB 2 finds that the C-RNTI 1 used by the UE 1 is the same as the C-RNTI 2 being used by the UE 2 in the cell of the eNB 2, and in this case, the eNB 2 may not change the C-RNTI of the UE 2, but enables the eNB 1 to change the C-RNTI of the UE 1.

(4) The eNB 2 sends a response message "Add Pico Response" to the eNB 1, where the "Add Pico Response" includes an indication "C-RNTI Collision" that indicates a collision between identifiers of the UE 1 and the UE 2, a list of C-RNTIs "Current C-RNTI List" that are used by user equipment served by the eNB 2, and a preamble "Dedicated Preamble_Pico" allocated by the eNB 2 to the UE 1.

(5) The eNB 1 triggers an intra-eNB identifier change procedure of changing a C-RNTI for the UE 1, to adjust the C-RNTI of the UE 1 from the C-RNTI 1 to the C-RNTI 3.

(6) The eNB 1 and the UE 1 execute an add procedure "Add Pico Procedure" to add the cell of the eNB 2 as a serving cell of the UE 1. The "Add Pico Procedure" carries a notification of the C-RNTI 3 and the preamble "Dedicated Preamble_Pico" allocated by the eNB 2 to the UE 1.

(7) The UE 1 initiates random access by using the preamble "Dedicated Preamble_Pico".

(8) The UE 1 receives a random access response sent by the eNB 2.

(9) The UE 1 sends the C-RNTI 3 to the eNB 2 by using a received uplink resource in the random access response.

In this way, a process of adding the cell of the eNB 2 as a serving cell of the UE 1 is completed. Then, the UE 1 uses the C-RNTI 3 to perform information transmission with the eNB 1 and the eNB 2, and the UE 2 continues using the C-RNTI 2 to perform information transmission with the eNB 2, so that interference caused by a C-RNTI collision is avoided.

Figure 11A:
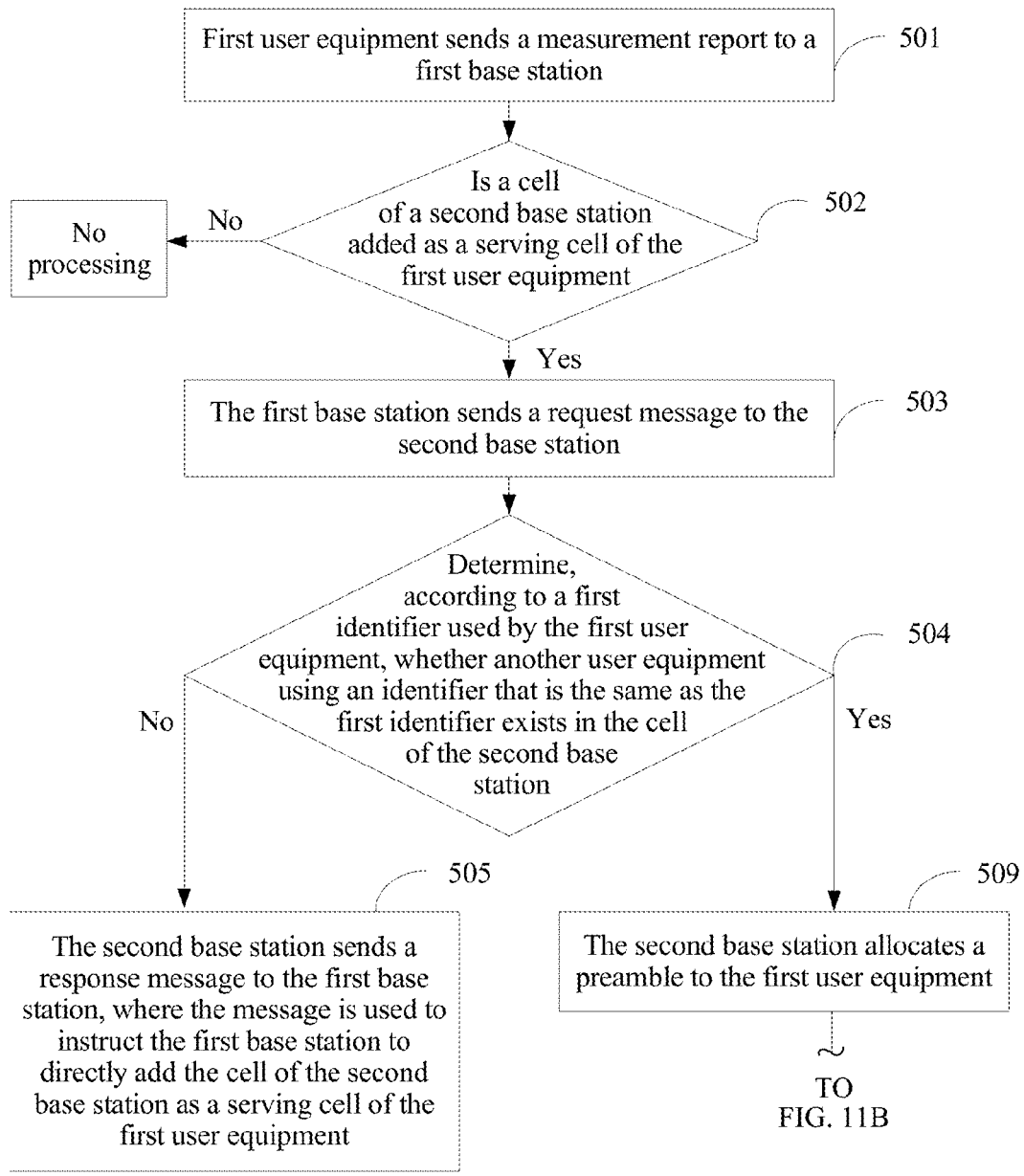
FIG. 11A and FIG. 11B are a schematic flowchart of another communication method according to an embodiment of the present invention.
Figure 11B:
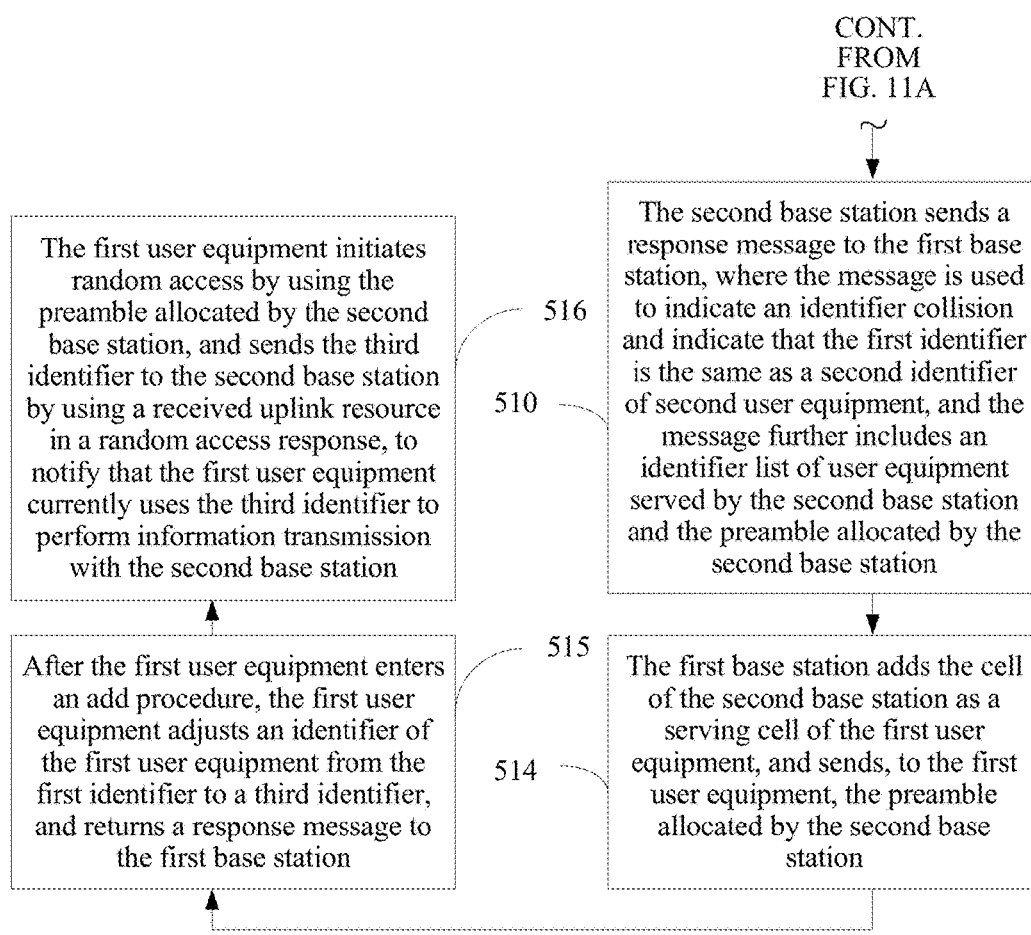

Alternatively, optionally, in another implementation manner, as shown in FIG. 11B, after step 510, the following steps may be performed instead of step 511.

514. The first base station adds the cell of the second base station as a serving cell of the first user equipment, and sends, to the first user equipment, the preamble allocated by the second base station.

Specifically, the first base station may send, to the first user equipment by using an add procedure "Add Pico Procedure", the preamble allocated by the second base station.

515. After the first user equipment enters an add procedure, the first user equipment adjusts an identifier of the first user equipment from the first identifier to a third identifier, and returns a response message to the first base station.

516. The first user equipment initiates random access by using the preamble allocated by the second base station, and sends the third identifier to the second base station by using a received uplink resource in a random access response, to notify that the first user equipment currently uses the third identifier to perform information transmission with the second base station.

In this way, a process of adding the cell of the second base station as a serving cell of the first user equipment is completed in another manner, and interference caused by an identifier collision is avoided.

In this implementation manner, a process of interaction among the first user equipment, the first base station, the second base station, and the second user equipment is basically the same as the procedure shown in FIG. 10, and differs in that when executing the add procedure "Add Pico Procedure", the first base station does not trigger an intra-base station identifier change procedure of changing an identifier for the first user equipment, but enables the first user equipment to change the identifier of the first user equipment. A procedure other than this is identical with the procedure shown in FIG. 10. For details, refer to the procedure shown in FIG. 10, and details are not described herein.

Therefore, after the process of adding the cell of the second base station as a serving cell of the first user equipment is completed, the first user equipment uses the third identifier to perform information transmission with the first base station and the second base station, and the first user equipment continues using the second identifier to perform information transmission with the second base station, so that interference caused by an identifier collision is avoided.

In addition, optionally, there is another implementation manner, and specific steps are described as follows.

After detecting that a signal of another cell, for example, a cell of a second base station is relatively strong, first user equipment reports a measurement report to a first base station. If the first base station determines to add the cell of the second base station as a serving cell of the first user equipment, the first base station sends a request message to the second base station, to request the second base station to add the cell of the second base station as a serving cell of the first user equipment. Then, the second base station replies to the first base station with a response message. The response message includes a dedicated preamble allocated by the second base station. The first user equipment may initiate random access to the second base station by using the preamble, and after receiving a random access response sent by the second base station, sets a temporary identifier (Temp-RNTI) in the random access response as a third identifier of the first user equipment, and sends a C-RNTI MAC CE (Media Access Control Element, Media Access Control) command in a message 3 (a message 3 in a protocol) to the second base station. The C-RNTI MACE command includes the third identifier. Then, the first user equipment can continue using a first identifier to perform information transmission with the first base station, and use the third identifier to perform information transmission with the second base station.

In the prior art, user equipment uses a C-RNTI 1 to communicate with a first base station. If the first base station adds a cell of a second base station as a serving cell of the user equipment, the user equipment obtains another C-RNTI 2 in a process of performing random access to the second base station. Then, the user equipment uses the two different C-RNTIs to respectively perform information transmission with the first base station and the second base station. In another prior art, if a first base station adds a cell of a second base station as a serving cell of the user equipment, the user equipment initiates random access on the second base station, and after achieving uplink synchronization by using a random access process, the user equipment uses a C-RNTI 1 to communicate with the first base station and the second base station. However, if the first prior art is used, user equipment needs to use two different C-RNTIs to respectively perform information transmission with two cells. This increases task complexity of the UE. If the second prior art is used, user equipment uses a same C-RNTI 1 to communicate with two base stations, and in this case, if another user equipment in a cell of a second base station also uses the C-RNTI 1, a collision may occur. Therefore, compared with the prior art, this embodiment of the present invention provides a mechanism for allocating a C-RNTI to user equipment, so that interference caused by a C-RNTI collision can be avoided.

This embodiment of the present invention provides a communication method. A first base station sends a request message to a second base station, to request the second base station to add a cell of the second base station as a serving cell of first user equipment. When finding that a first identifier of the first user equipment is the same as an identifier of second user equipment served by the second base station, the second base station sends a response message to the first base station to indicate that the first identifier is the same as the second identifier. The first base station adjusts the first identifier to a third identifier, and sends the third identifier to the second base station; or the second base station adjusts the first identifier to a third identifier; or the second base station allocates a preamble to the first user equipment, and the first user equipment initiates random access according to the preamble, and sends a third identifier to the second base station by using a received uplink resource in a random access response. Therefore, a cell temporary identifier collision is avoided.

Figure 12:
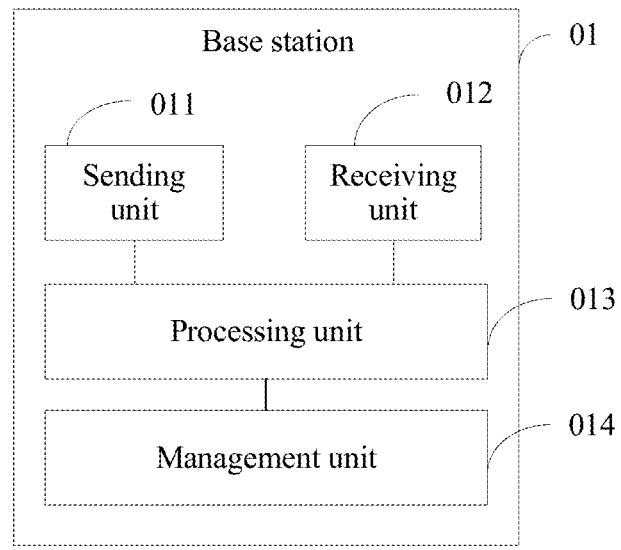
FIG. 12 is a schematic structural diagram of a base station according to an embodiment of the present invention.

An embodiment of the present invention provides a base station 01, which may be used as a first base station in the embodiments of the present invention. As shown in FIG. 12, the base station 01 includes:

a sending unit 011, configured to send a request message to a second base station, where the request message is used to request the second base station to add a cell of the second base station as a serving cell of first user equipment, the request message includes a first identifier of the first user equipment, and the base station serves the first user equipment;

a receiving unit 012, configured to receive a response message sent by the second base station;

a processing unit 013, configured to: when the response message indicates that the first identifier is the same as a second identifier of second user equipment, perform collision processing on the first identifier, where the second base station serves the second user equipment. That the first identifier is the same as the second identifier of the second user equipment herein specifically means whether second user equipment using a second identifier that is the same as the first identifier exists in the cell of the second base station, and the second user equipment herein is not designated and may be any user equipment in the cell of the second base station; and a management unit 014, configured to add the cell of the second base station as a serving cell of the first user equipment. In addition, if the response message indicates that user equipment using an identifier that is the same as the first identifier does not exist, the management unit 014 may directly add the cell of the second base station as a serving cell of the first user equipment. Alternatively, the response message indicating that user equipment using an identifier that is the same as the first identifier does not exist may be sent to the base station 01 after the second base station adjusts the second identifier of the second user equipment served by the second base station to a third identifier.

Optionally, the response message further includes an identifier list of user equipment served by the second base station, and the identifier list includes the second identifier.

The processing unit 013 is specifically configured to:

adjust the first identifier to the third identifier, where the identifier list does not include the third identifier.

Optionally, the sending unit 011 is further configured to: send the third identifier to the second base station.

Optionally, the response message further includes a preamble of the first user equipment, so that the first user equipment initiates random access according to the preamble, and sends the third identifier to the second base station by using a received uplink resource in a random access response.

The preamble of the first user equipment in the response message is a dedicated preamble allocated by the second base station to the first user equipment after the second base station receives the request message of the base station 01. The preamble is sent to the base station 01 by using the response message, and then, the base station 01 sends the preamble to the first user equipment, so that the first user equipment initiates random access to the second base station according to the preamble.

Optionally, the first identifier to the third identifier are separately cell radio network temporary identifiers of user equipment.

The base station 01 may be a macro base station, and the second base station may be a micro base station.

This embodiment of the present invention provides a base station. The base station sends a request message to a second base station, to request the second base station to add a cell of the second base station as a serving cell of first user equipment. When finding that a first identifier of the first user equipment is the same as an identifier of second user equipment served by the second base station, the second base station sends a response message to the base station to indicate that the first identifier is the same as the second identifier. The base station adjusts the first identifier to a third identifier, and sends the third identifier to the second base station; or the second base station adjusts the first identifier to a third identifier; or the second base station allocates a preamble to the first user equipment, and the first user equipment initiates random access according to the preamble, and sends a third identifier to the second base station by using a received uplink resource in a random access response. Therefore, a cell temporary identifier collision is avoided.

Figure 13:
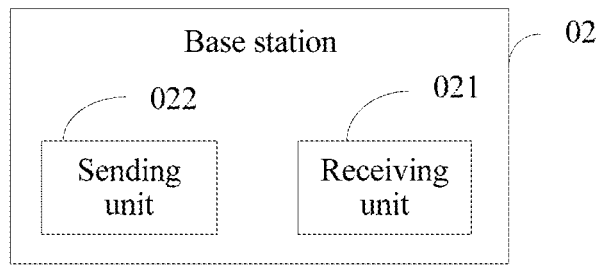
FIG. 13 is a schematic structural diagram of another base station according to an embodiment of the present invention.

An embodiment of the present invention provides another base station 02, which may be used as a second base station in the embodiments of the present invention. As shown in FIG. 13, the base station 02 includes:

a receiving unit 021, configured to receive a request message sent by a first base station, where the request message is used to request the base station to add a cell of the base station as a serving cell of first user equipment, the request message includes a first identifier of the first user equipment, and the first base station serves the first user equipment; and a sending unit 022, configured to: when it is determined that the first identifier is different from a second identifier of second user equipment, send a response message to the first base station, so that the first base station adds the cell of the base station as a serving cell of the first user equipment, where the base station 02 serves the second user equipment.

Figure 14:
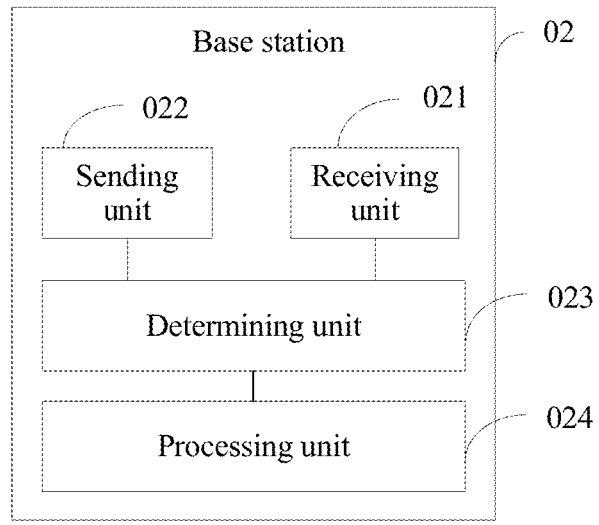
FIG. 14 is a schematic structural diagram of another base station according to an embodiment of the present invention.

Optionally, as shown in FIG. 14, the base station 02 may further include a determining unit 023 and a processing unit 024.

The determining unit 023 is configured to: determine whether the first identifier is the same as the second identifier, and send a determining result to the processing unit.

Details may include the following:

The first identifier of the first user equipment is compared with identifiers of all user equipments in the cell of the base station 02, so as to determine whether second user equipment using a second identifier that is the same as the first identifier exists in the cell of the base station 02. The second user equipment herein is not designated and may be any user equipment in the cell of the base station 02.

The processing unit 024 is configured to: receive the processing result sent by the determining unit, and when it is determined that the first identifier is the same as the second identifier, adjust the second identifier to a third identifier, where the third identifier is different from an identifier of user equipment served by the base station 02.

Optionally, because a step of adjusting an identifier is performed by the base station 02, the first base station is not concerned about whether the base station 02 performs the step of adjusting an identifier, but concerned only about whether the first user equipment can continue using the first identifier. Therefore, after the base station 02 adjusts the second identifier to the third identifier, the response message that the base station 02 replies to the first base station may indicate that user equipment using an identifier that is the same as the first identifier does not exist; or may carry no additional indication, and is the same as a response message existing when there is no identifier collision.

Optionally, when it is determined that the first identifier is the same as the second identifier of the second user equipment, the base station 02 not only adjusts the second identifier of the second user equipment, but also may indicate, in the response message sent to the first base station, that user equipment using an identifier that is the same as the first identifier exists, and add an identifier list of user equipment served by the base station 02 to the response message; and the identifier list includes the second identifier, so that after receiving the response message, the first base station adjusts the first identifier of the first user equipment to the third identifier. The third identifier is not in the identifier list.

Optionally, when determining that the first identifier is the same as the second identifier of the second user equipment, the base station 02 may further add a preamble to the response message sent to the first base station. The preamble is a dedicated preamble allocated by the base station 02 to the first user equipment after the base station 02 receives the request message of the first base station. The preamble is sent to the first base station by using the response message, and then, the first base station sends the preamble to the first user equipment, so that the first user equipment initiates random access to the second base station according to the preamble.

Optionally, the first identifier to the third identifier are separately cell radio network temporary identifiers of user equipment.

The first base station may be a macro base station, and the base station 02 may be a micro base station.

This embodiment of the present invention provides a base station. A first base station sends a request message to the base station, to request the base station to add a cell of the base station as a serving cell of first user equipment. When finding that a first identifier of the first user equipment is the same as an identifier of second user equipment served by the base station, the base station sends a response message to the first base station to indicate that the first identifier is the same as the second identifier. The first base station adjusts the first identifier to a third identifier, and sends the third identifier to the base station; or the base station adjusts the first identifier to a third identifier; or the base station allocates a preamble to the first user equipment, and the first user equipment initiates random access according to the preamble, and sends a third identifier to the base station by using a received uplink resource in a random access response. Therefore, a cell temporary identifier collision is avoided.

Figure 15:
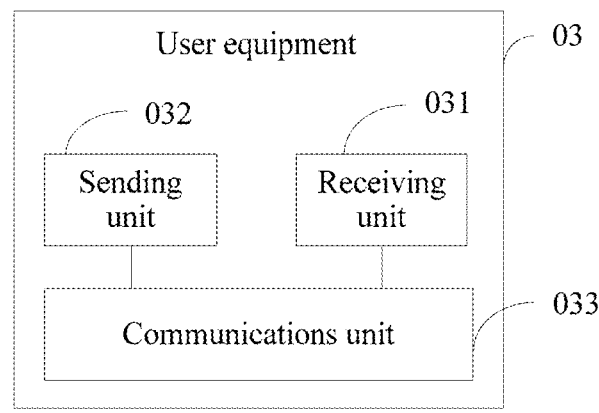
FIG. 15 is a schematic structural diagram of user equipment according to an embodiment of the present invention.

An embodiment of the present invention provides user equipment 03. As shown in FIG. 15, the user equipment 03 includes a receiving unit 031, a sending unit 032, and a communications unit 033.

The receiving unit 031 is configured to receive a third identifier sent by a first base station, where the first base station serves the user equipment 03, and the third identifier is used by the user equipment 03 to communicate with the first base station.

A method for obtaining the third identifier that is sent by the first base station and received by the receiving unit 031 is: When a second base station determines that a first identifier is the same as a second identifier of second user equipment in a cell of the second base station, the first base station adjusts the first identifier of the user equipment 03 to the third identifier.

The sending unit 032 is configured to send the third identifier to the second base station, where the third identifier is different from an identifier of user equipment served by the second base station, and the second base station serves the second user equipment.

The communications unit 033 is configured to communicate with the second base station by using the third identifier.

Figure 16:
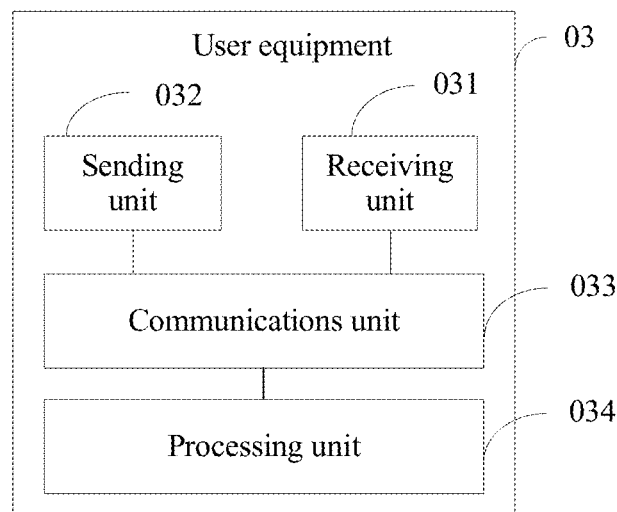
FIG. 16 is a schematic structural diagram of user equipment according to an embodiment of the present invention.

Optionally, as shown in FIG. 16, the user equipment 03 may further include:

a processing unit 034, configured to: if the third identifier sent by the first base station is not received, update the first identifier of the user equipment to the third identifier, where the first identifier is the same as the second identifier.

Optionally, the sending unit 032 is specifically configured to:

receive a preamble sent by the first base station; and initiate random access according to the preamble, and send the third identifier to the second base station by using a received uplink resource in a random access response.

The preamble is a dedicated preamble allocated by the second base station to the user equipment 03 after the second base station receives a request message of the first base station. The preamble is sent to the first base station by using a response message, and then, the first base station sends the preamble to the user equipment 03.

The first identifier to the third identifier are separately cell radio network temporary identifiers of user equipment.

The first base station is a macro base station, and the second base station is a micro base station.

This embodiment of the present invention provides user equipment. A first base station sends a request message to a second base station, to request the second base station to add a cell of the second base station as a serving cell of the user equipment. When finding that a first identifier of the user equipment is the same as an identifier of second user equipment served by the second base station, the second base station sends a response message to the first base station to indicate that the first identifier is the same as the second identifier. The first base station adjusts the first identifier to a third identifier, and sends the third identifier to the second base station; or the second base station adjusts the first identifier to a third identifier; or the second base station allocates a preamble to the user equipment, and the user equipment initiates random access according to the preamble, and sends a third identifier to the second base station by using a received uplink resource in a random access response. Therefore, a cell temporary identifier collision is avoided.

Figure 17:
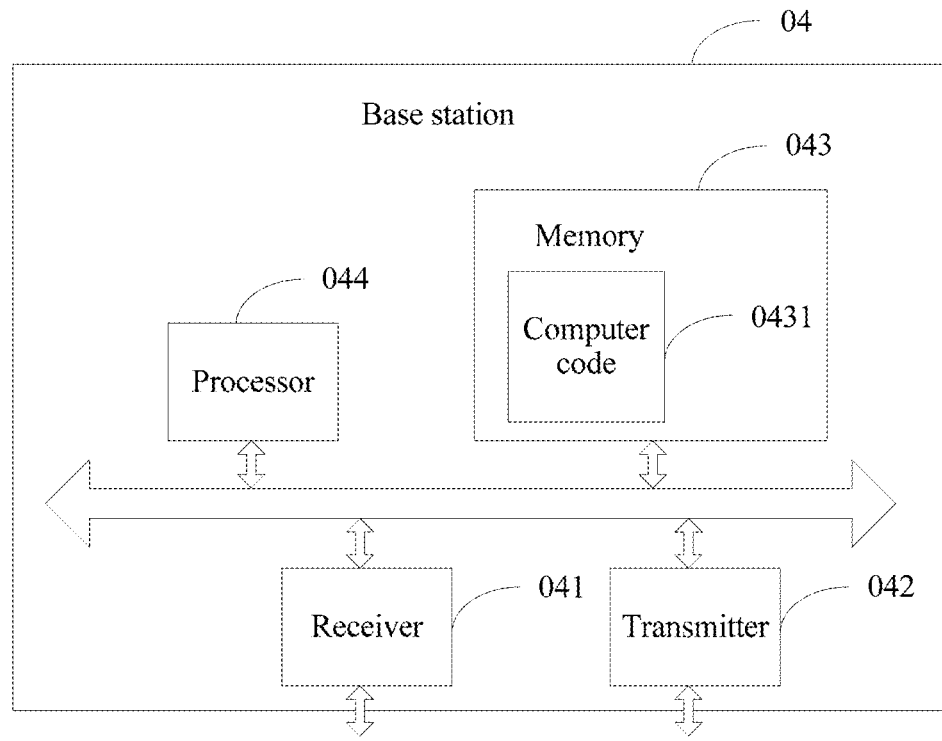
FIG. 17 is a schematic structural diagram of another base station according to an embodiment of the present invention.

An embodiment of the present invention further provides a base station 04, which may be used as a first base station in the embodiments of the present invention. As shown in FIG. 17, the base station 04 includes a receiver 041, a transmitter 042, a memory 043, and a processor 044. The memory 043 is configured to store computer code 0431.

The transmitter 042 is configured to send a request message to a second base station, where the request message is used to request the second base station to add a cell of the second base station as a serving cell of first user equipment, the request message includes a first identifier of the first user equipment, and the base station serves the first user equipment.

The receiver 041 is configured to receive a response message sent by the second base station.

The processor 044 executes the computer code 0431 to perform the following operations:

when the response message indicates that the first identifier is the same as a second identifier of second user equipment, performing collision processing on the first identifier, where the second base station serves the second user equipment. That the first identifier is the same as the second identifier of the second user equipment herein specifically means whether second user equipment using a second identifier that is the same as the first identifier exists in the cell of the second base station, and the second user equipment herein is not designated and may be any user equipment in the cell of the second base station; and adding the cell of the second base station as a serving cell of the first user equipment. In addition, if the response message indicates that user equipment using an identifier that is the same as the first identifier does not exist, the cell of the second base station may be directly added as a serving cell of the first user equipment. Alternatively, the response message indicating that user equipment using an identifier that is the same as the first identifier does not exist may be sent to the base station 04 after the second base station adjusts the second identifier of the second user equipment served by the second base station to a third identifier.

Optionally, the response message further includes an identifier list of user equipment served by the second base station, and the identifier list includes the second identifier.

That the processor 044 executes the computer code 0431 to specifically perform collision processing on the first identifier specifically includes:

adjusting the first identifier to the third identifier, where the identifier list does not include the third identifier.

Optionally, the transmitter 042 is further configured to:

send the third identifier to the second base station.

Optionally, the response message further includes a preamble of the user equipment, so that the first user equipment initiates random access according to the preamble, and sends the third identifier to the second base station by using a received uplink resource in a random access response.

The preamble of the first user equipment in the response message is a dedicated preamble allocated by the second base station to the first user equipment after the second base station receives the request message of the base station 04. The preamble is sent to the base station 04 by using the response message, and then, the base station 04 sends the preamble to the first user equipment, so that the first user equipment initiates random access to the second base station according to the preamble.

Optionally, the first identifier to the third identifier are separately cell radio network temporary identifiers of user equipment.

The base station 04 may be a macro base station, and the second base station may be a micro base station.

This embodiment of the present invention provides a base station. The base station sends a request message to a second base station, to request the second base station to add a cell of the second base station as a serving cell of first user equipment. When finding that a first identifier of the first user equipment is the same as an identifier of second user equipment served by the second base station, the second base station sends a response message to the first base station to indicate that the first identifier is the same as the second identifier. The base station adjusts the first identifier to a third identifier, and sends the third identifier to the second base station; or the second base station adjusts the first identifier to a third identifier; or the second base station allocates a preamble to the first user equipment, and the first user equipment initiates random access according to the preamble, and sends a third identifier to the second base station by using a received uplink resource in a random access response. Therefore, a cell temporary identifier collision is avoided.

Figure 18:
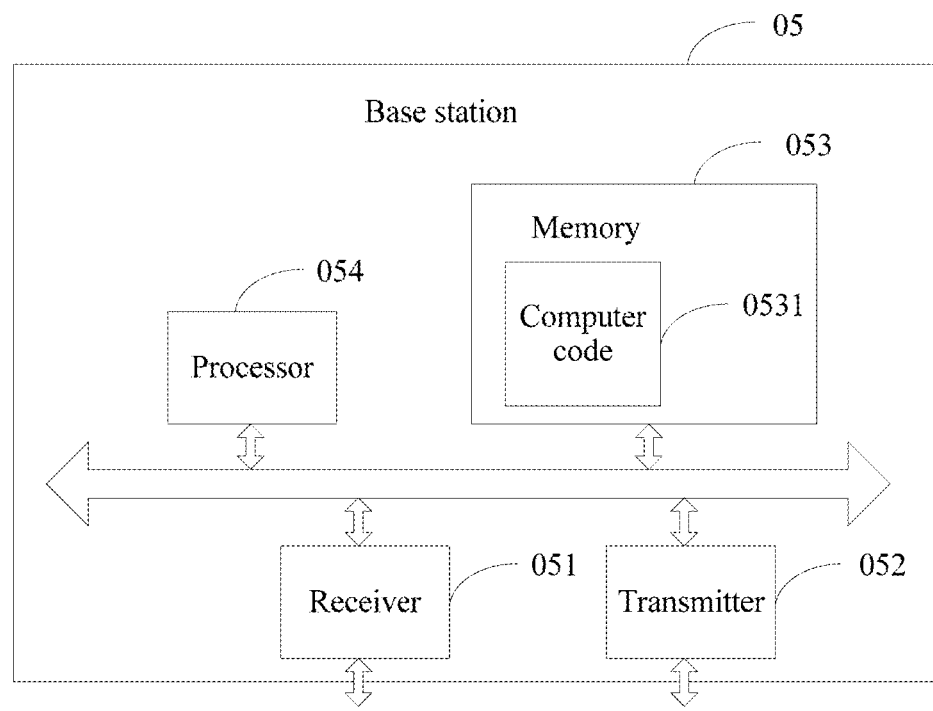
FIG. 18 is a schematic structural diagram of another base station according to an embodiment of the present invention.

An embodiment of the present invention further provides a base station 05, which may be used as a second base station in the embodiments of the present invention. As shown in FIG. 18, the base station 05 includes a receiver 051, a transmitter 052, a memory 053, and a processor 054. The memory 053 is configured to store a program 0531.

The receiver 051 is configured to receive a request message sent by a first base station, where the request message is used to request the base station to add a cell of the base station as a serving cell of first user equipment, the request message includes a first identifier of the first user equipment, and the first base station serves the first user equipment.

The transmitter 052 is configured to: when it is determined that the first identifier is different from a second identifier of second user equipment, send a response message to the first base station, so that the first base station adds the cell of the base station as a serving cell of the first user equipment, where the base station serves the second user equipment.

Optionally, the processor 054 executes the computer code 0531 to perform the following operations:

determining whether the first identifier is the same as the second identifier; where details may include the following:

The first identifier of the first user equipment is compared with identifiers of all user equipments in the cell of the base station 05, so as to determine whether second user equipment using a second identifier that is the same as the first identifier exists in the cell of the base station 05; and the second user equipment herein is not designated and may be any user equipment in the cell of the base station 05; and when it is determined that the first identifier is the same as the second identifier, adjusting the second identifier to a third identifier, where the third identifier is different from an identifier of user equipment served by the second base station.

Optionally, because a step of adjusting an identifier is performed by the base station 05, the first base station is not concerned about whether the base station 05 performs the step of adjusting an identifier, but concerned only about whether the first user equipment can continue using the first identifier. Therefore, after the base station 05 adjusts the second identifier to the third identifier, the transmitter 052 may reply to the first base station with the response message to indicate that user equipment using an identifier that is the same as the first identifier does not exist; or the response message may carry no additional indication, and is the same as a response message existing when there is no identifier collision.

Optionally, when it is determined that the first identifier is the same as the second identifier of the second user equipment, the base station 05 adjusts the second identifier of the second user equipment, and in addition, the transmitter 052 of the base station 05 may indicate, in the response message sent to the first base station, that user equipment using an identifier that is the same as the first identifier exists, and add an identifier list of user equipment served by the base station 05 to the response message; and the identifier list includes the second identifier, so that after receiving the response message, the first base station adjusts the first identifier of the first user equipment to the third identifier. The third identifier is not in the identifier list.

Optionally, when determining that the first identifier is the same as the second identifier of the second user equipment, the transmitter 052 of the base station 05 may further add a preamble to the response message sent to the first base station. The preamble is a dedicated preamble allocated by the base station 05 to the first user equipment after the base station 05 receives the request message of the first base station. The preamble is sent to the first base station by using the response message, and then, the first base station sends the preamble to the first user equipment, so that the first user equipment initiates random access to the second base station according to the preamble.

Optionally, the first identifier to the third identifier are separately cell radio network temporary identifiers of user equipment.

The first base station may be a macro base station, and the base station 05 may be a micro base station.

This embodiment of the present invention provides a base station. A first base station sends a request message to the base station, to request the base station to add a cell of the base station as a serving cell of first user equipment. When finding that a first identifier of the first user equipment is the same as an identifier of second user equipment served by the base station, the base station sends a response message to the first base station to indicate that the first identifier is the same as the second identifier. The first base station adjusts the first identifier to a third identifier, and sends the third identifier to the base station; or the base station adjusts the first identifier to a third identifier; or the base station allocates a preamble to the first user equipment, and the first user equipment initiates random access according to the preamble, and sends a third identifier to the base station by using a received uplink resource in a random access response. Therefore, a cell temporary identifier collision is avoided.

Figure 19:
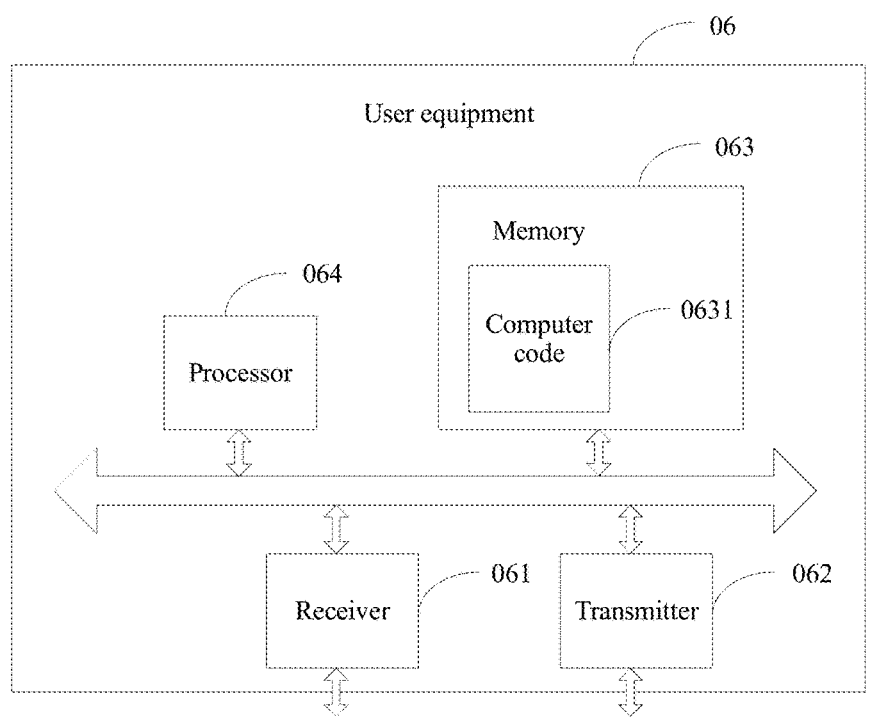
FIG. 19 is a schematic structural diagram of another user equipment according to an embodiment of the present invention.

An embodiment of the present invention further provides user equipment 06. As shown in FIG. 19, the user equipment 06 includes a receiver 061, a transmitter 062, a memory 063, and a processor 064. The memory 064 is configured to store computer code 0631.

The receiver 061 is configured to receive a third identifier sent by a first base station, where the first base station serves the user equipment, and the third identifier is used by the user equipment to communicate with the first base station.

A method for obtaining the third identifier that is sent by the first base station and received by the receiver 061 is: When a second base station determines that a first identifier is the same as a second identifier of second user equipment in a cell of the second base station, the first base station adjusts the first identifier of the user equipment 06 to the third identifier.

The transmitter 062 is configured to send the third identifier to the second base station, where the third identifier is different from an identifier of user equipment served by the second base station, and the second base station serves the second user equipment.

The processor 064 executes the computer code 0631 to communicate with the second base station by using the third identifier.

Optionally, if the third identifier sent by the first base station is not received, the processor 064 executes the computer code 0631 to specifically perform the following operation:

updating the first identifier of the user equipment to the third identifier, where the first identifier is the same as the second identifier.

Optionally, the receiver 061 is specifically configured to receive a preamble sent by the first base station.

The transmitter 062 is specifically configured to: initiate random access according to the preamble, and send the third identifier to the second base station by using a received uplink resource in a random access response.

The preamble is a dedicated preamble allocated by the second base station to the user equipment 06 after the second base station receives a request message of the first base station. The preamble is sent to the first base station by using a response message, and then, the first base station sends the preamble to the user equipment 06.

Optionally, the first identifier to the third identifier are separately cell radio network temporary identifiers of user equipment.

The first base station may be a macro base station, and the second base station may be a micro base station.

This embodiment of the present invention provides user equipment. A first base station sends a request message to a second base station, to request the second base station to add a cell of the second base station as a serving cell of the user equipment. When finding that a first identifier of the user equipment is the same as an identifier of second user equipment served by the second base station, the second base station sends a response message to the first base station to indicate that the first identifier is the same as the second identifier. The first base station adjusts the first identifier to a third identifier, and sends the third identifier to the second base station; or the second base station adjusts the first identifier to a third identifier; or the second base station allocates a preamble to the user equipment, and the user equipment initiates random access according to the preamble, and sends a third identifier to the second base station by using a received uplink resource in a random access response. Therefore, a cell temporary identifier collision is avoided.

In the embodiments provided in this application, it should be understood that the disclosed method, apparatus, and system may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes instructions for instructing a computer device (which may be a personal computer, a server, or a network device) to perform some of the steps of the methods described in the embodiments of the present invention. The foregoing storage medium includes any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementation manners of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A communication method comprising:
    sending, by a first base station, a first identifier of a first terminal to a second base station, wherein the first base station serves the first terminal;
    receiving, by the first base station, a message sent from the second base station, wherein the message indicates that the first identifier is the same as a second identifier of a second terminal served by the second base station; and
    adjusting, by the first base station, the first identifier to avoid collision with identifiers of terminals served by the second base station, including the second identifier of the second terminal.

2. The method according to claim 1, wherein the receiving the message sent from the second base station further comprises:
    receiving, by the first base station, an identifier list of terminals served by the second base station, wherein the identifier list comprises the second identifier; and
    wherein the adjusting the first identifier further comprises:
    adjusting, by the first base station, the first identifier to a third identifier, wherein the third identifier is absent in the identifier list.

3. The method according to claim 2, further comprising:
    sending, by the first base station, the third identifier to the second base station.

4. The method according to claim 2, wherein
the first identifier, the second identifier, and the third identifier are cell radio network temporary identifiers of the terminals.

5. A communication method comprising:
receiving, by a second base station, a first identifier of a first terminal sent from a first base station, wherein the first terminal is served by the first base station; and
adjusting, by the second base station, a second identifier of a second terminal to avoid collision with the first identifier of the first terminal when the second identifier is the same as the first identifier,
wherein the second terminal is served by the secondary base station, and the second identifier is adjusted to a third identifier different from any identifier of other terminals served by the second base station and different from the first identifier of the first terminal.

6. The method according to claim 5, wherein the first identifier, the second identifier, and the third identifier are cell radio network temporary identifiers of terminals.

7. A communication method comprising:
receiving, by a first base station, an identifier list of terminals served by a second base station;
confirming, by the first base station, first and second identifiers of first and second terminals, respectively, are the same, wherein the first and second terminals are served by the first and second base stations, respectively;
adjusting, by the first base station, the first identifier of the first terminal to avoid collision with identifiers of the terminals served by the second base station when the identifier list comprises the first identifier, wherein the first identifier is adjusted to a third identifier that is not in the identifier list.

8. The method according to claim 7, further comprising sending, by the first base station, the third identifier to the second base station.

9. The method according to claim 7, wherein the first identifier, the second identifier, and the third identifier are cell radio network temporary identifiers of the terminals.

10. A base station comprising:
a transmitter configured to cooperate with a processor to send a first identifier of a first terminal to a second base station, wherein the second base station serves the first terminal;
a receiver configured to cooperate with the processor to receive a message sent from the second base station, wherein the message indicates that the first identifier is the same as a second identifier of a second terminal served by the second base station; and
the processor configured to adjust the first identifier to avoid collision with identifiers of terminals served by the second base station, including the second identifier of the second terminal.

11. The base station according to claim 10, wherein
the receiver is further configured to cooperate with the processor to receive an identifier list of the terminals served by the second base station, wherein the identifier list comprises the second identifier; and
the processor is further configured to adjust the first identifier to a third identifier, wherein the third identifier is absent in the identifier list.

12. The base station according to claim 11, wherein the transmitter is further configured to cooperate with the processor to send the third identifier to the second base station.

13. The base station according to claim 11, wherein the first identifier, the second identifier, and the third identifier are cell radio network temporary identifiers of the terminals.

14. A base station comprising:
a receiver configured to cooperate with a processor to receive a first identifier of a first terminal sent from a first base station, wherein the first terminal is served by the first base station; and
the processor configured to adjust a second identifier of a second terminal to avoid collision with the first identifier of the first terminal when the second identifier is the same as the first identifier,
wherein the second terminal is served by the base station, and the second identifier is adjusted to a third identifier different from any identifier of other terminals served by the second base station and different from the first identifier of the first terminal.

15. The base station according to claim 14, wherein the first identifier, the second identifier, and the third identifier are cell radio network temporary identifiers of the terminals.

16. A first base station comprising:
a receiver configured to cooperate with a processor to receive an identifier list of terminals served by a second base station; and
the processor configured to
confirm a first identifier of a first terminal served by the first base station is the same as a second identifier of a second terminal served by the second base station, wherein the identifier list comprises the second identifier; and
adjust the first identifier of the first terminal to avoid collision with identifiers of terminals served by the second base station when the identifier list comprises the first identifier, wherein the first identifier is adjusted to a third identifier that is not in the identifier list.

17. The base station according to claim 16, further comprising a transmitter configured to cooperate with the processor to send the third identifier to the second base station.

18. The base station according to claim 16, wherein the first identifier, the second identifier, and the third identifier are cell radio network temporary identifiers of the terminals.

* * * * *